US012598010B2

(12) United States Patent
Hehn et al.

(10) Patent No.: US 12,598,010 B2
(45) Date of Patent: Apr. 7, 2026

(54) PATHLOSS PREDICTION USING A MACHINE LEARNING COMPONENT

(71) Applicant: QUALCOMM Incorporated, San Diego, CA (US)

(72) Inventors: Thomas Markus Hehn, Delft (NL); Tribhuvanesh Orekondy, Wettingen (CH); Arash Behboodi, Amsterdam (NL); Ori Shental, Marlboro, NJ (US); Taesang Yoo, San Diego, CA (US); June Namgoong, San Diego, CA (US); Akash Sandeep Doshi, San Diego, CA (US); Ashwin Sampath, Skillman, NJ (US); Juan Carlos Bucheli Garcia, Marseilles (FR); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 18/584,572

(22) Filed: Feb. 22, 2024

(65) Prior Publication Data

US 2024/0364437 A1 Oct. 31, 2024

Related U.S. Application Data

(60) Provisional application No. 63/498,452, filed on Apr. 26, 2023.

(51) Int. Cl.
| | |
|---|---|
| *H04W 16/22* | (2009.01) |
| *H04B 17/309* | (2015.01) |
| *H04B 17/391* | (2015.01) |

(52) U.S. Cl.
CPC ....... *H04B 17/347* (2023.05); *H04B 17/3913* (2015.01)

(58) Field of Classification Search
CPC .......... G06N 3/02; G06N 3/042; G06N 3/044; G06N 3/0442; G06N 3/045; G06N 3/0455;
(Continued)

(56) References Cited

U.S. PATENT DOCUMENTS

| | | | | | |
|---|---|---|---|---|---|
| 5,987,328 | A | * | 11/1999 | Ephremides .......... | H04W 16/18 |
| | | | | | 455/446 |
| 2020/0169895 | A1* | | 5/2020 | Chen ..................... | H04W 16/18 |

(Continued)

OTHER PUBLICATIONS

Hehn et al., Transformer-Based Neural Surrogate for Link-Level Path Loss Prediction from Variable-Sized Maps, arXiv, 6 pages, Oct. 10, 2023.*

(Continued)

*Primary Examiner* — Frank Duong
(74) *Attorney, Agent, or Firm* — Harrity & Harrity, LLP

(57) ABSTRACT

Various aspects of the present disclosure generally relate to wireless communication. In some aspects, a network node may obtain position information associated with a first subset of network node positions, of a set of network node positions, in connection with a map associated with a wireless coverage area. The network node may obtain map information associated with the map and may determine, based on a machine learning component, a first plurality of predicted pathloss values associated with a second subset of network node positions of the set of network node positions. Numerous other aspects are described.

20 Claims, 14 Drawing Sheets

(58) Field of Classification Search
CPC ...... G06N 3/0464; G06N 3/0499; G06N 3/08;
G06N 3/088; G06N 3/09; G06N 3/091;
G06N 3/092; G06N 20/00; G06N 20/10;
H04B 17/347; H04B 17/3912; H04B
17/3913; H04L 25/0254; H04L 25/03165;
H04L 2012/5686; H04L 2025/03464;
H04L 41/145; H04L 41/16; H04L 45/08;
H04W 16/22
See application file for complete search history.

(56) References Cited

U.S. PATENT DOCUMENTS

| | | | | |
|---|---|---|---|---|
| 2022/0163616 A1* | 5/2022 | Rappaport | ........... | G01C 21/206 |
| 2024/0284192 A1* | 8/2024 | Tomie | ................. | H04B 17/373 |
| 2025/0300751 A1* | 9/2025 | Zhang | ................. | H04W 16/18 |

OTHER PUBLICATIONS

Dosovitskiy et al., An Image is Worth 16×16 Words: Transformers for Image Recognition at Scale, arXiv, 22 pages, Jun. 3, 2021.*

* cited by examiner

100

200

Bus
205

Processor
210

Memory
215

Input
Component
220

Output
Component
225

Communication
Interface
230

Communication
Manager
235

Machine Learning
Component
240

Figure 11:
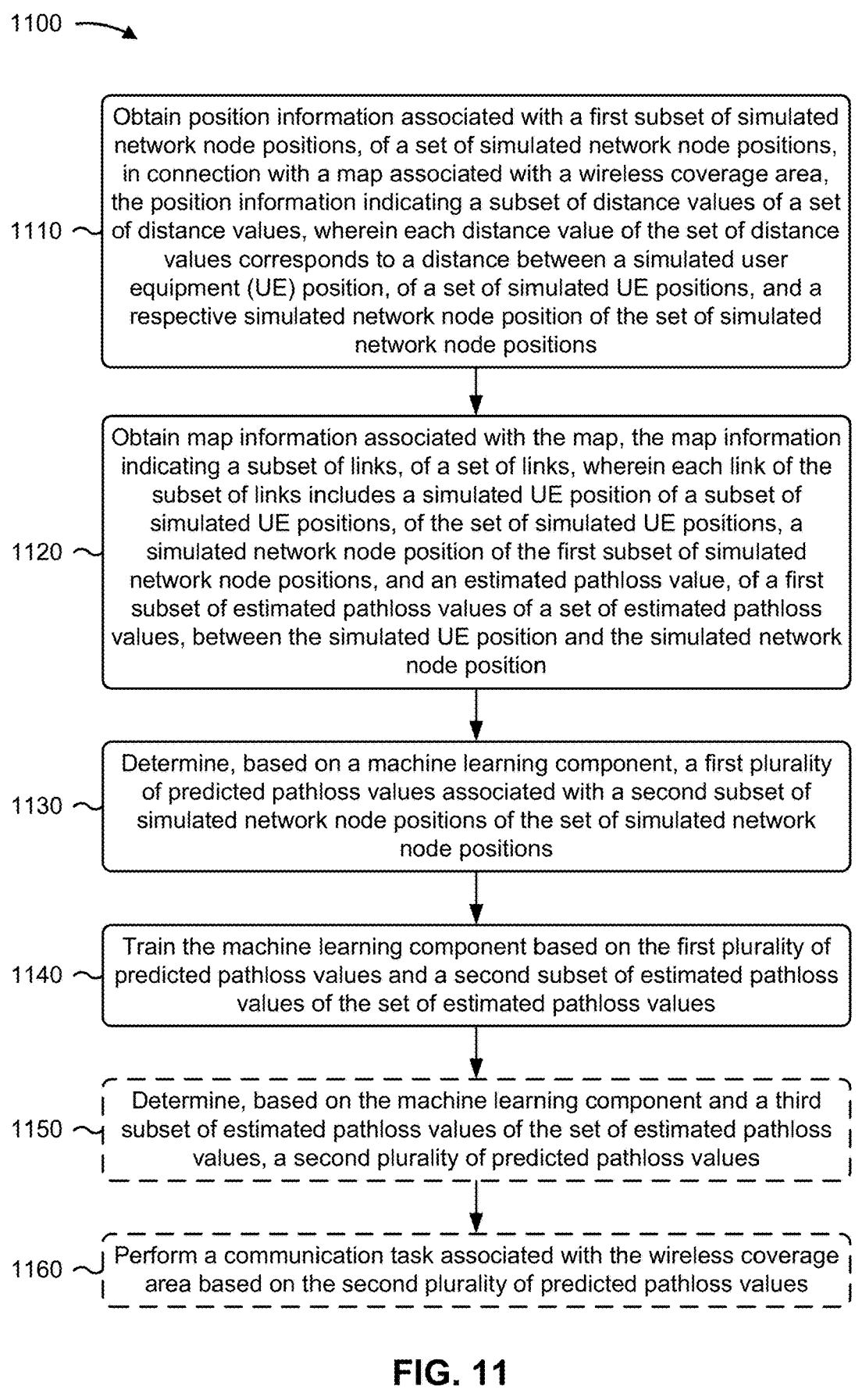

1100 ⟶

1110 ⟋ Obtain position information associated with a first subset of simulated network node positions, of a set of simulated network node positions, in connection with a map associated with a wireless coverage area, the position information indicating a subset of distance values of a set of distance values, wherein each distance value of the set of distance values corresponds to a distance between a simulated user equipment (UE) position, of a set of simulated UE positions, and a respective simulated network node position of the set of simulated network node positions 1120 ⟋ Obtain map information associated with the map, the map information indicating a subset of links, of a set of links, wherein each link of the subset of links includes a simulated UE position of a subset of simulated UE positions, of the set of simulated UE positions, a simulated network node position of the first subset of simulated network node positions, and an estimated pathloss value, of a first subset of estimated pathloss values of a set of estimated pathloss values, between the simulated UE position and the simulated network node position 1130 ⟋ Determine, based on a machine learning component, a first plurality of predicted pathloss values associated with a second subset of simulated network node positions of the set of simulated network node positions 1140 ⟋ Train the machine learning component based on the first plurality of predicted pathloss values and a second subset of estimated pathloss values of the set of estimated pathloss values 1150 ⟋ Determine, based on the machine learning component and a third subset of estimated pathloss values of the set of estimated pathloss values, a second plurality of predicted pathloss values 1160 ⟋ Perform a communication task associated with the wireless coverage area based on the second plurality of predicted pathloss values

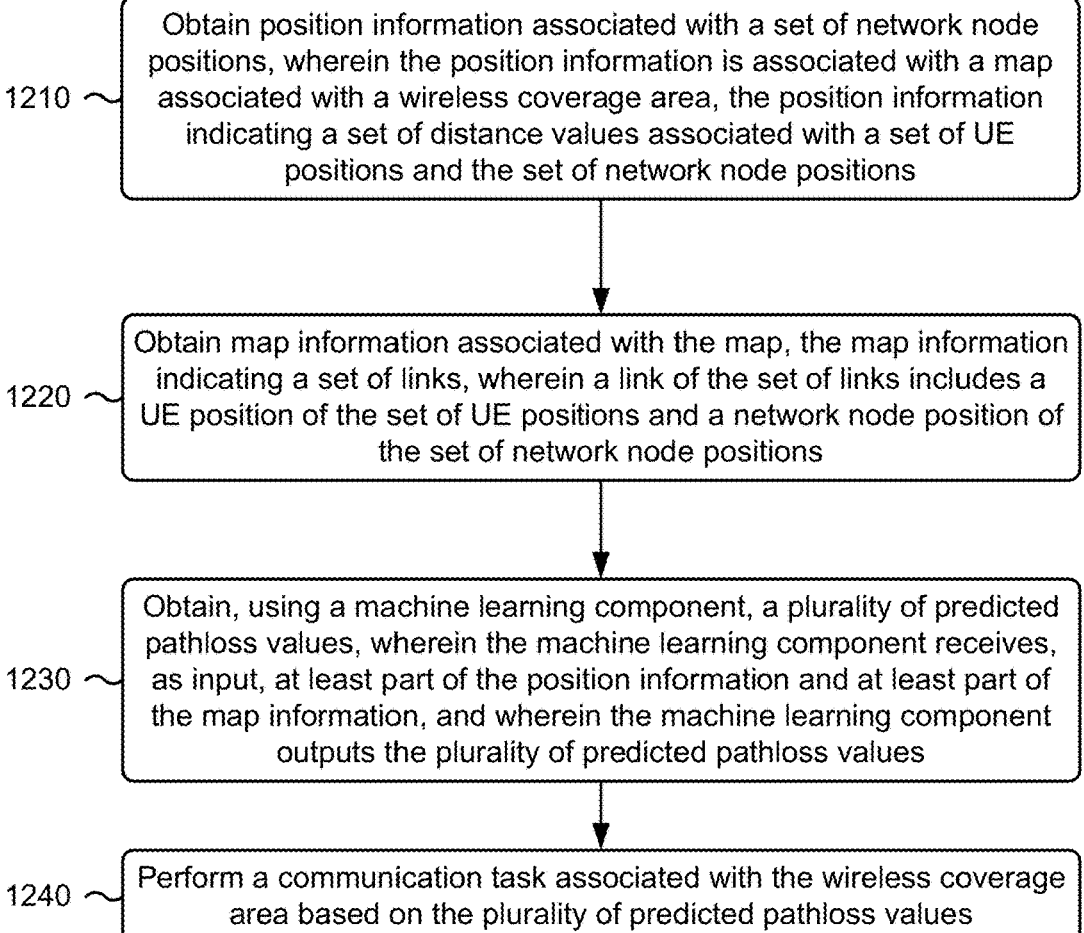

1210 ⟋ Obtain position information associated with a set of network node positions, wherein the position information is associated with a map associated with a wireless coverage area, the position information indicating a set of distance values associated with a set of UE positions and the set of network node positions 1220 ⟋ Obtain map information associated with the map, the map information indicating a set of links, wherein a link of the set of links includes a UE position of the set of UE positions and a network node position of the set of network node positions 1230 ⟋ Obtain, using a machine learning component, a plurality of predicted pathloss values, wherein the machine learning component receives, as input, at least part of the position information and at least part of the map information, and wherein the machine learning component outputs the plurality of predicted pathloss values 1240 ⟋ Perform a communication task associated with the wireless coverage area based on the plurality of predicted pathloss values

FIG. 12

PATHLOSS PREDICTION USING A MACHINE LEARNING COMPONENT

CROSS-REFERENCE TO RELATED APPLICATION

This Patent Application claims priority to U.S. Provisional Patent Application No. 63/498,452, filed on Apr. 26, 2023, entitled "PATHLOSS PREDICTION USING A MACHINE LEARNING COMPONENT," and assigned to the assignee hereof. The disclosure of the prior Application is considered part of and is incorporated by reference into this Patent Application.

FIELD OF THE DISCLOSURE

Aspects of the present disclosure generally relate to wireless communication and specifically relate to techniques and apparatuses for pathloss prediction using a machine learning component.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, system bandwidth and/or device transmit power). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies, massive multiple-input multiple-output (MIMO), disaggregated network architectures and network topology expansions, multiple-subscriber implementations, and/or high-precision positioning, among other examples. As the demand for mobile broadband access continues to increase, further improvements in NR may be implemented, and other radio access technologies such as 6G may be introduced to further advance mobile broadband evolution.

Channel models can be developed to determine locations for deploying network nodes and to be used in positioning operations associated with network nodes and user equipment (UE). For example, ray tracing can be used to develop three-dimensional (3D) urban micro (UMi) and 3D urban macro (UMa) channel models for urban environments in which buildings (and other structures) and foliage can cause signal attenuation. However, ray tracing in large network deployments can result in complex models that lead to computational burdens when being used to predict locations of new network nodes and/or to determine positions of existing network nodes.

SUMMARY

Some aspects described herein relate to a network node for wireless communication. The network node may include one or more memories and one or more processors coupled to the one or more memories. The one or more processors may be configured to obtain position information associated with a first subset of network node positions, of a set of network node positions, in connection with a map associated with a wireless coverage area, the position information indicating a subset of distance values of a set of distance values, wherein each distance value of the set of distance values corresponds to a distance between a user equipment (UE) position, of a set of UE positions, and a respective network node position of the set of network node positions. The one or more processors may be configured to obtain map information associated with the map, the map information indicating a subset of links, of a set of links, wherein each link of the subset of links includes a UE position of a subset of UE positions, of the set of UE positions, a network node position of the first subset of network node positions, and an estimated pathloss value, of a first subset of estimated pathloss values of a set of estimated pathloss values, between the UE position and the network node position. The one or more processors may be configured to determine, based on a machine learning component, a first plurality of predicted pathloss values associated with a second subset of network node positions of the set of network node positions. The one or more processors may be configured to train the machine learning component based on the first plurality of predicted pathloss values and a second subset of estimated pathloss values of the set of estimated pathloss values. The one or more processors may be configured to determine, based on the machine learning component and a third subset of estimated pathloss values of the set of estimated pathloss values, a second plurality of predicted pathloss values. The one or more processors may be configured to perform a communication task associated with the wireless coverage area based on the second plurality of predicted pathloss values.

Some aspects described herein relate to a method of wireless communication performed by a network node. The method may include obtaining position information associated with a first subset of network node positions, of a set of network node positions, in connection with a map associated with a wireless coverage area, the position information indicating a subset of distance values of a set of distance values, wherein each distance value of the set of distance values corresponds to a distance between a UE position, of a set of UE positions, and a respective network node position of the set of network node positions. The method may include obtaining map information associated with the map, the map information indicating a subset of links, of a set of links, wherein each link of the subset of links includes a UE position of a subset of UE positions, of the set of UE positions, a network node position of the first subset of network node positions, and an estimated pathloss value, of a first subset of estimated pathloss values of a set of estimated pathloss values, between the UE position and the network node position. The method may include determining, based on a machine learning component, a first plurality of predicted pathloss values associated with a second subset of network node positions of the set of network node positions. The method may include training the machine learning component based on the first plurality of predicted pathloss values and a second subset of estimated pathloss values of the set of estimated pathloss values. The method may include determining, based on the machine learning component and a third subset of estimated pathloss values of the set of estimated pathloss values, a second plurality of predicted pathloss values. The method may include performing a communication task associated with the wireless coverage area based on the second plurality of predicted pathloss values.

Some aspects described herein relate to a non-transitory computer-readable medium that stores a set of instructions for wireless communication by a network node. The set of instructions, when executed by one or more processors of the network node, may cause the network node to obtain position information associated with a first subset of network node positions, of a set of network node positions, in connection with a map associated with a wireless coverage area, the position information indicating a subset of distance values of a set of distance values, wherein each distance value of the set of distance values corresponds to a distance between a UE position, of a set of UE positions, and a respective network node position of the set of network node positions. The set of instructions, when executed by one or more processors of the network node, may cause the network node to obtain map information associated with the map, the map information indicating a subset of links, of a set of links, wherein each link of the subset of links includes a UE position of a subset of UE positions, of the set of UE positions, a network node position of the first subset of network node positions, and an estimated pathloss value, of a first subset of estimated pathloss values of a set of estimated pathloss values, between the UE position and the network node position. The set of instructions, when executed by one or more processors of the network node, may cause the network node to determine, based on a machine learning component, a first plurality of predicted pathloss values associated with a second subset of network node positions of the set of network node positions. The set of instructions, when executed by one or more processors of the network node, may cause the network node to train the machine learning component based on the first plurality of predicted pathloss values and a second subset of estimated pathloss values of the set of estimated pathloss values. The set of instructions, when executed by one or more processors of the network node, may cause the network node to determine, based on the machine learning component and a third subset of estimated pathloss values of the set of estimated pathloss values, a second plurality of predicted pathloss values. The set of instructions, when executed by one or more processors of the network node, may cause the network node to perform a communication task associated with the wireless coverage area based on the second plurality of predicted pathloss values.

Some aspects described herein relate to an apparatus for wireless communication. The apparatus may include means for obtaining position information associated with a first subset of network node positions, of a set of network node positions, in connection with a map associated with a wireless coverage area, the position information indicating a subset of distance values of a set of distance values, wherein each distance value of the set of distance values corresponds to a distance between a UE position, of a set of UE positions, and a respective network node position of the set of network node positions. The apparatus may include means for obtaining map information associated with the map, the map information indicating a subset of links, of a set of links, wherein each link of the subset of links includes a UE position of a subset of UE positions, of the set of UE positions, a network node position of the first subset of network node positions, and an estimated pathloss value, of a first subset of estimated pathloss values of a set of estimated pathloss values, between the UE position and the network node position. The apparatus may include means for determining, based on a machine learning component, a first plurality of predicted pathloss values associated with a second subset of network node positions of the set of network node positions. The apparatus may include means for training the machine learning component based on the first plurality of predicted pathloss values and a second subset of estimated pathloss values of the set of estimated pathloss values. The apparatus may include means for determining, based on the machine learning component and a third subset of estimated pathloss values of the set of estimated pathloss values, a second plurality of predicted pathloss values. The apparatus may include means for performing a communication task associated with the wireless coverage area based on the second plurality of predicted pathloss values.

In some aspects, a method of wireless communication performed by a network node includes obtaining position information associated with a set of network node positions, wherein the position information is associated with a map associated with a wireless coverage area, the position information indicating a set of distance values associated with a set of UE positions and the set of network node positions; obtaining map information associated with the map, the map information indicating a set of links, wherein a link of the set of links includes a UE position of the set of UE positions and a network node position of the set of network node positions; obtaining, using a machine learning component, a plurality of predicted pathloss values, wherein the machine learning component receives, as input, at least part of the position information and at least part of the map information, and wherein the machine learning component outputs the plurality of predicted pathloss values; and performing a communication task associated with the wireless coverage area based on the plurality of predicted pathloss values.

In some aspects, a method of wireless communication performed by a network node includes obtaining position information associated with a first subset of network node positions, of a set of network node positions, in connection with a map associated with a wireless coverage area, the position information indicating a subset of distance values of a set of distance values, wherein each distance value of the set of distance values corresponds to a distance between a user equipment (UE) position, of a set of UE positions, and a respective network node position of the set of network node positions; obtaining map information associated with the map, the map information indicating a subset of links, of a set of links, wherein each link of the subset of links includes a UE position of a subset of UE positions, of the set of UE positions, a network node position of the first subset of network node positions, and an estimated pathloss value, of a first subset of estimated pathloss values of a set of estimated pathloss values, between the UE position and the network node position; determining, based on a machine learning component, a first plurality of predicted pathloss values associated with a second subset of network node positions of the set of network node positions; training the machine learning component based on the first plurality of predicted pathloss values and a second subset of estimated pathloss values of the set of estimated pathloss values; and outputting information associated with the machine learning component.

In some aspects, an apparatus for wireless communication at a network node includes one or more memories; and one or more processors, coupled to the one or more memories, configured to cause the network node to: obtain position information associated with a set of network node positions, wherein the position information is associated with a map associated with a wireless coverage area, the position information indicating a set of distance values associated with a set of UE positions and the set of network node positions; obtain map information associated with the map, the map information indicating a set of links, wherein a link of the set of links includes a UE position of the set of UE positions and a network node position of the set of network node positions; obtain, using a machine learning component, a plurality of predicted pathloss values, wherein the machine learning component receives, as input, at least part of the position information and at least part of the map information, and wherein the machine learning component outputs the plurality of predicted pathloss values; and perform a communication task associated with the wireless coverage area based on the plurality of predicted pathloss values.

In some aspects, an apparatus for wireless communication at a network node includes one or more memories; and one or more processors, coupled to the one or more memories, configured to cause the network node to: obtain position information associated with a first subset of network node positions, of a set of network node positions, in connection with a map associated with a wireless coverage area, the position information indicating a subset of distance values of a set of distance values, wherein each distance value of the set of distance values corresponds to a distance between a user equipment (UE) position, of a set of UE positions, and a respective network node position of the set of network node positions; obtain map information associated with the map, the map information indicating a subset of links, of a set of links, wherein each link of the subset of links includes a UE position of a subset of UE positions, of the set of UE positions, a network node position of the first subset of network node positions, and an estimated pathloss value, of a first subset of estimated pathloss values of a set of estimated pathloss values, between the UE position and the network node position; determine, based on a machine learning component, a first plurality of predicted pathloss values associated with a second subset of network node positions of the set of network node positions; train the machine learning component based on the first plurality of predicted pathloss values and a second subset of estimated pathloss values of the set of estimated pathloss values; and output information associated with the machine learning component.

In some aspects, a non-transitory computer-readable medium storing a set of instructions for wireless communication includes one or more instructions that, when executed by one or more processors of a network node, cause the network node to: obtain position information associated with a set of network node positions, wherein the position information is associated with a map associated with a wireless coverage area, the position information indicating a set of distance values associated with a set of UE positions and the set of network node positions; obtain map information associated with the map, the map information indicating a set of links, wherein a link of the set of links includes a UE position of the set of UE positions and a network node position of the set of network node positions; obtain, using a machine learning component, a plurality of predicted pathloss values, wherein the machine learning component receives, as input, at least part of the position information and at least part of the map information, and wherein the machine learning component outputs the plurality of predicted pathloss values; and perform a communication task associated with the wireless coverage area based on the plurality of predicted pathloss values.

In some aspects, a non-transitory computer-readable medium storing a set of instructions for wireless communication includes one or more instructions that, when executed by one or more processors of a network node, cause the network node to: obtain position information associated with a first subset of network node positions, of a set of network node positions, in connection with a map associated with a wireless coverage area, the position information indicating a subset of distance values of a set of distance values, wherein each distance value of the set of distance values corresponds to a distance between a user equipment (UE) position, of a set of UE positions, and a respective network node position of the set of network node positions; obtain map information associated with the map, the map information indicating a subset of links, of a set of links, wherein each link of the subset of links includes a UE position of a subset of UE positions, of the set of UE positions, a network node position of the first subset of network node positions, and an estimated pathloss value, of a first subset of estimated pathloss values of a set of estimated pathloss values, between the UE position and the network node position; determine, based on a machine learning component, a first plurality of predicted pathloss values associated with a second subset of network node positions of the set of network node positions; train the machine learning component based on the first plurality of predicted pathloss values and a second subset of estimated pathloss values of the set of estimated pathloss values; and output information associated with the machine learning component.

In some aspects, an apparatus for wireless communication includes means for obtaining position information associated with a set of network node positions, wherein the position information is associated with a map associated with a wireless coverage area, the position information indicating a set of distance values associated with a set of UE positions and the set of network node positions; means for obtaining map information associated with the map, the map information indicating a set of links, wherein a link of the set of links includes a UE position of the set of UE positions and a network node position of the set of network node positions; means for obtaining, using a machine learning component, a plurality of predicted pathloss values, wherein the machine learning component receives, as input, at least part of the position information and at least part of the map information, and wherein the machine learning component outputs the plurality of predicted pathloss values; and means for performing a communication task associated with the wireless coverage area based on the plurality of predicted pathloss values.

In some aspects, an apparatus for wireless communication includes means for obtaining position information associated with a first subset of network node positions, of a set of network node positions, in connection with a map associated with a wireless coverage area, the position information indicating a subset of distance values of a set of distance values, wherein each distance value of the set of distance values corresponds to a distance between a user equipment (UE) position, of a set of UE positions, and a respective network node position of the set of network node positions; means for obtaining map information associated with the map, the map information indicating a subset of links, of a set of links, wherein each link of the subset of links includes a UE position of a subset of UE positions, of the set of UE positions, a network node position of the first subset of network node positions, and an estimated pathloss value, of a first subset of estimated pathloss values of a set of estimated pathloss values, between the UE position and the network node position; means for determining, based on a machine learning component, a first plurality of predicted pathloss values associated with a second subset of network node positions of the set of network node positions; means for training the machine learning component based on the first plurality of predicted pathloss values and a second subset of estimated pathloss values of the set of estimated pathloss values; and means for outputting information associated with the machine learning component.

Aspects generally include a method, apparatus, system, computer program product, non-transitory computer-readable medium, user equipment, base station, network node, network entity, wireless communication device, and/or processing system as substantially described with reference to and as illustrated by the drawings.

The foregoing has broadly summarized some aspects of the present disclosure. Additional aspects and associated advantages will be described hereinafter. The disclosed aspects may be used as a basis for modifying or designing other aspects for carrying out the same purposes of the present disclosure. Such equivalent aspects do not depart from the scope of the appended claims. Characteristics of the aspects disclosed herein, both their organization and method of operation, together with associated advantages will be better understood from the following description when considered in connection with the accompanying drawings. Each of the drawings is provided for the purposes of illustration and description, and not as a definition of the limits of the claims.

BRIEF DESCRIPTION OF THE DRAWINGS

The appended drawings illustrate some aspects of the present disclosure, but are not limiting of the scope of the present disclosure because the description may enable other aspects. The same reference numbers in different drawings may identify the same or similar elements.

FIG. 11 is a diagram illustrating an example process performed, for example, by a network node, in accordance with the present disclosure.

FIG. 12 is a diagram of an example apparatus for wireless communication, in accordance with the present disclosure.

DETAILED DESCRIPTION

Figure 1:
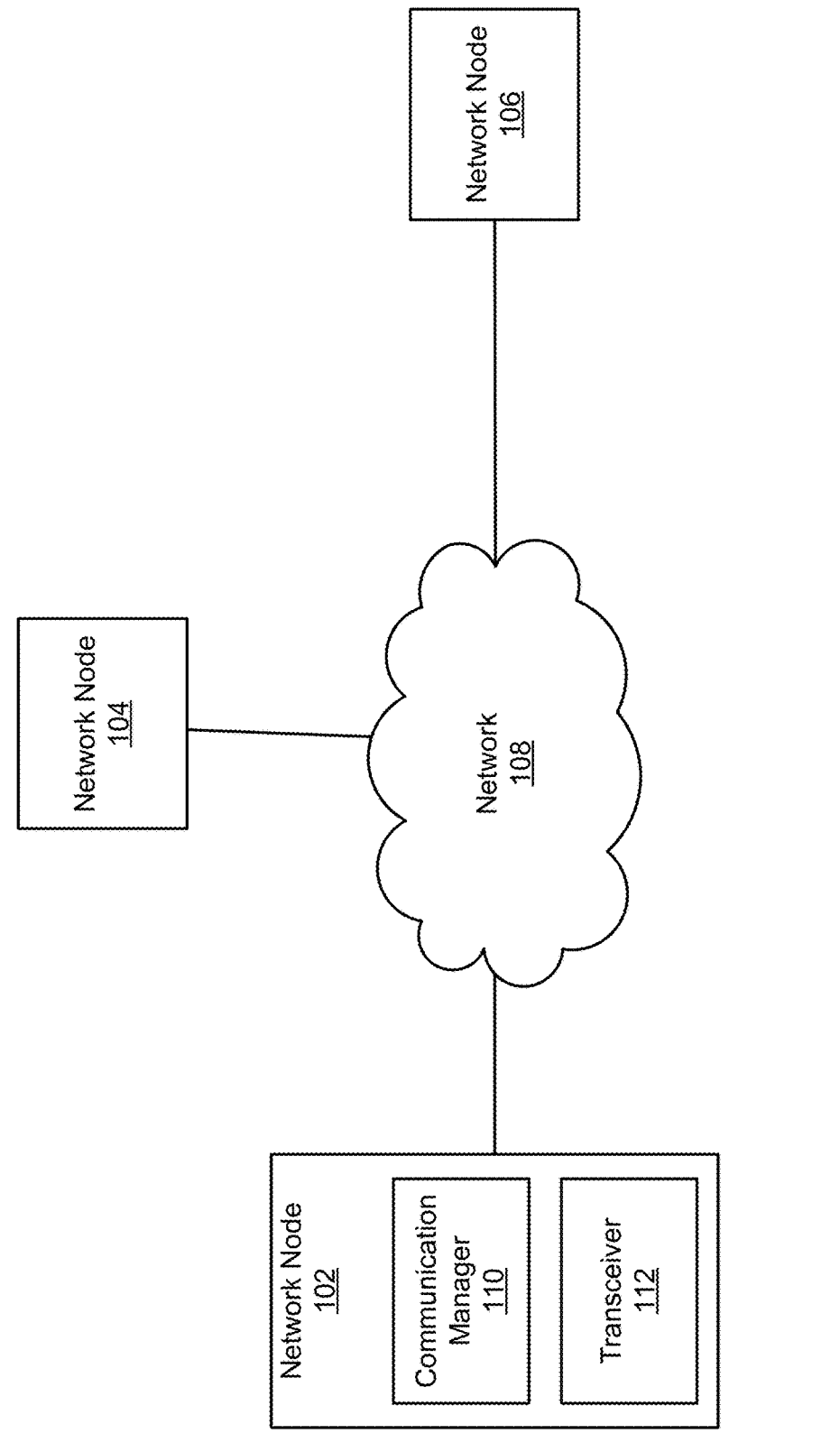
FIG. 1 is a diagram illustrating an example environment in which apparatuses and/or methods described herein may be implemented, in accordance with the present disclosure.

Various aspects of the disclosure are described hereinafter with reference to the accompanying drawings. However, this disclosure may be embodied in many different forms and is not to be construed as limited to any specific aspect presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using any quantity of the aspects set forth herein. In addition, the scope of the disclosure is intended to cover an apparatus or method that is practiced using another structure, functionality, or structure and functionality in addition to or other than the various aspects of the disclosure set forth herein. Any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to using machine learning for predicting pathloss values associated with links between user equipment (UEs) and network nodes. Some aspects more specifically relate to using a portion of a dataset developed using ray tracing or other techniques to predict pathloss associated with network node positions and UE positions, such as by using a per-link training and modeling approach. In some examples, the dataset may include a set of network node positions, a set of UE positions, and a set of distance vectors. Each distance vector may include a direction component that indicates a direction of a signal traveling between a network node position and a UE position, as well as a distance value indicating the distance between the two positions. In some examples, a network node may obtain position information that includes a first subset of the set of distance vectors and map information associated with a map (e.g., digital twin) associated with a wireless coverage area that includes a first subset of the network node positions and a first subset of the UE positions. The map information also may include a subset of links, each link including a network node position, a UE position, and an estimated pathloss value associated with the distance vector between the network node position and the UE position.

In some examples, the network node may use a machine learning component that includes one or more neural network components to predict a first plurality of predicted pathloss values associated with a second subset of positions of the dataset. A third subset of the dataset may be used as validation data that may be used to train the machine learning component. In some examples, a fourth subset of the dataset may be used to test the machine learning component. In some examples, the trained machine learning component may be deployed to facilitate determining locations for deploying new network nodes by predicting pathloss values associated with potential network node positions and/or to facilitate positioning operations with respect to UEs and/or network nodes.

Particular aspects of the subject matter described in this disclosure can be implemented to realize one or more of the following potential advantages. In some examples, the techniques described herein may be used to predict, based on received signals of existing network nodes, optimal positions of new network nodes, thereby improving the coverage of a wireless network. In some examples, the techniques described herein may be used to predict coverage of UEs or network nodes in the wireless network. In some examples, the techniques described herein may facilitate more rapid and accurate computations for channel modeling of a wireless coverage area as a result of being trainable based on different wireless network environments. In some examples, the techniques described herein may be used to more rapidly and accurately determine the position (e.g., localization) of existing UEs and network nodes by facilitating more accurate 3D channel models for urban environments. This may be referred to as an inverse problem, in which an output of the model (that is, predicted pathloss) can be used to identify an input of the model (that is, UE position). Techniques described herein may provide superior performance for UE positioning relative to other approaches such as ray tracing, since these other approaches may lack differentiability (e.g., automatic differentiability) in comparison to the model(s) described herein.

The per-link training and modeling approach may provide improved performance and scalability over image-to-image modeling approaches, since the per-link training and modeling approach may provide pathloss prediction for arbitrary map sizes irrespective of a training map size.

FIG. 1 is a diagram illustrating an example environment 100 in which apparatuses and/or methods described herein may be implemented, in accordance with the present disclosure. As shown in FIG. 1, the environment 100 may include a network node 102, a network node 104, and a network node 106, that may communicate with one another via a network 108. The network nodes 102, 104, and 106 may be dispersed throughout the network 108, and each network node 102, 104, and 106 may be stationary and/or mobile. The network 108 may include wired communication connections, wireless communication connections, or a combination of wired and wireless communication connections.

The network 108 may include, for example, a cellular network (e.g., a Long-Term Evolution (LTE) network, a code division multiple access (CDMA) network, a 3G network, a 4G network, a 5G network, another type of next generation network such as a 6G network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

In general, any number of networks 108 may be deployed in a given geographic area. Each network 108 may support a particular radio access technology (RAT) and may operate on one or more frequencies. A RAT may be referred to as a radio technology, an air interface, or the like. A frequency may be referred to as a carrier, a frequency channel, or the like. In some examples, each frequency may support a single RAT in a given geographic area in order to avoid interference between wireless networks of different RATs. In some cases, Open-RAT, New Radio (NR) (5G), or 6G RAT networks may be deployed.

As described herein, a network node (which may alternatively be referred to as a node, a network entity, or a wireless node) may be, be similar to, include, or be included in (e.g., be a component of) a base station (e.g., any base station described herein, including a disaggregated base station), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity.

The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa. As an example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

As shown, the network node 102 may include a communication manager 110 and a transceiver 112. The communication manager 110 may be configured to perform one or more communication tasks as described herein. In some aspects, the communication manager 110 may direct the transceiver 112 to perform one or more communication tasks as described herein. Although depicted, for clarity of description, with reference only to the network node 102, any one or more of the network nodes 102, 104, and 106 also may include a communication manager and a transceiver.

In some aspects, the communication manager 110 may obtain position information associated with a first subset of network node positions, of a set of network node positions, in connection with a map associated with a wireless coverage area, the position information indicating a subset of distance values of a set of distance values, wherein each distance value of the set of distance values corresponds to a distance between a UE position, of a set of UE positions, and a respective network node position of the set of network node positions; obtain map information associated with the map, the map information indicating a subset of links, of a set of links, wherein each link of the subset of links includes a UE position of a subset of UE positions, of the set of UE positions, a network node position of the first subset of network node positions, and an estimated pathloss value, of a first subset of estimated pathloss values of a set of estimated pathloss values, between the UE position and the network node position; determine, based on a machine learning component, a first plurality of predicted pathloss values associated with a second subset of network node positions of the set of network node positions; train the machine learning component based on the first plurality of predicted pathloss values and a second subset of estimated pathloss values of the set of estimated pathloss values; determine, based on the machine learning component and a third subset of estimated pathloss values of the set of estimated pathloss values, a second plurality of predicted pathloss values; and perform a communication task associated with the wireless coverage area based on the second plurality of predicted pathloss values. Additionally, or alternatively, the communication manager 110 may perform one or more other operations described herein.

The number and arrangement of entities shown in FIG. 1 are provided as one or more examples. In practice, there may be additional network nodes and/or networks, fewer network nodes and/or networks, different network nodes and/or networks, or differently arranged network nodes and/or networks than those shown in FIG. 1. Furthermore, the network node 102, 104, and/or 106 may be implemented using a single apparatus or multiple apparatuses.

Figure 2:
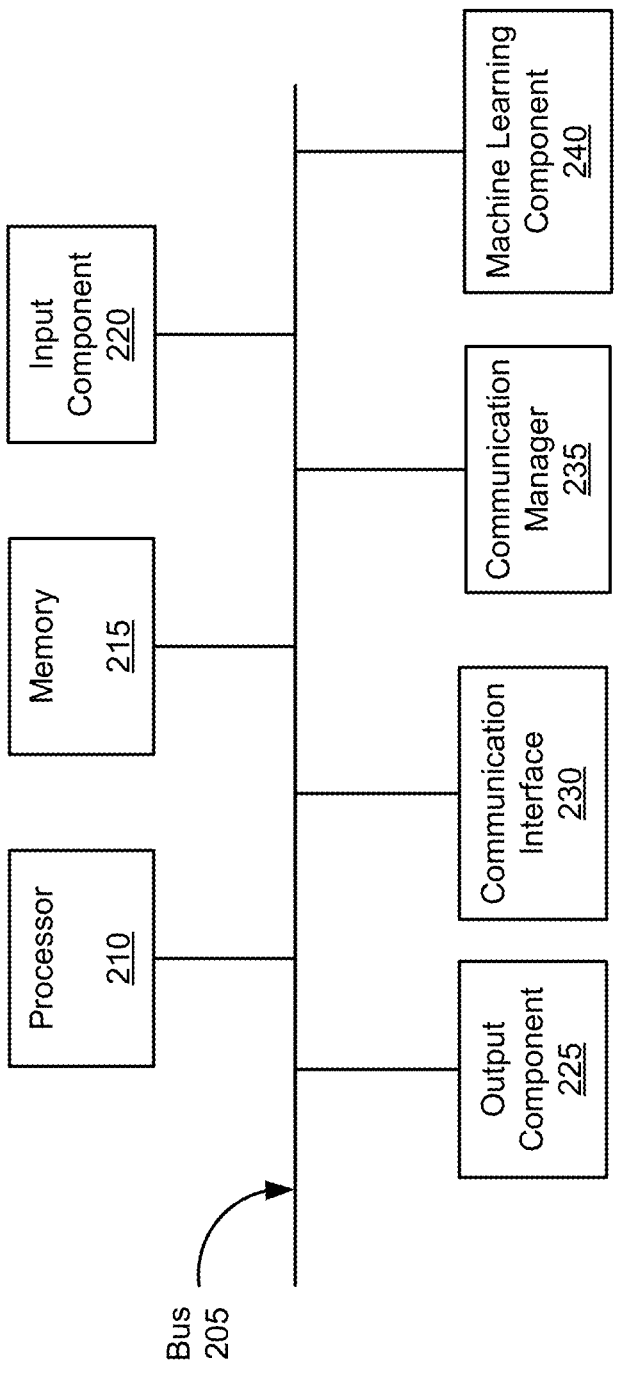
FIG. 2 is a diagram of example components of an apparatus, in accordance with the present disclosure.

FIG. 2 is a diagram of example components of an apparatus 200, in accordance with the present disclosure. The apparatus 200 may correspond to any one or more of the network nodes 102, 104, and/or 106. Additionally, or alternatively, any one or more of the network nodes 102, 104, and/or 106 may include one or more apparatuses 200 and/or one or more components of the apparatus 200. For example, in some aspects, the apparatus 200 may include an apparatus (e.g., a device, a device component, a modem, a chip, and/or a set of device components, among other examples) that is configured to perform a wireless communication method, as described herein. As shown in FIG. 2, the apparatus 200 may include components such as a bus 205, a processor 210, a memory 215, an input component 220, an output component 225, a communication interface 230, a communication manager 235, and a machine learning component 240. Any one or more of the components 205, 210, 215, 220, 225 230, 235, and/or 240 may be implemented in hardware, software, or a combination of hardware and software.

The bus 205 includes a component that permits communication among the components of the apparatus 200. The processor 210 includes a central processing unit (CPU), a graphics processing unit (GPU), an accelerated processing unit (APU), a digital signal processor (DSP), a microprocessor, a microcontroller, a field-programmable gate array (FPGA), an application-specific integrated circuit (ASIC), a neural processing unit (NPU), and/or another type of processing component. In some aspects, the processor 210 includes one or more processors capable of being programmed to perform a function. For example, the one or more processors of the processor 210 may perform functions individually or collectively.

The memory 215 includes a random-access memory (RAM), a read only memory (ROM), and/or another type of dynamic or static storage device (e.g., a flash memory, a magnetic memory, and/or an optical memory) that stores information and/or instructions for use by the processor 210. The memory 215 may store other information and/or software related to the operation and use of the apparatus 200. For example, the memory 215 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium. In some aspects, the memory 215 includes one or more memories capable of storing information and/or instructions for use by the processor 210.

The input component 220 includes a component that permits the apparatus 200 to receive information, such as via user input. For example, the input component 220 may be associated with a user interface as described herein (e.g., to permit a user to interact with the one or more features of the apparatus 200). The input component 220 may include a capacitive touchscreen display that can receive user inputs. The input component 220 may include a keyboard, a keypad, a mouse, a button, a switch, and/or a microphone, among other examples. Additionally, or alternatively, the input component 220 may include a sensor for sensing information (e.g., a vision sensor, a location sensor, an accelerometer, a gyroscope, and/or an actuator, among other examples). In some aspects, the input component 220 may include a camera (e.g., a high-resolution camera and/or a low-resolution camera, among other examples). The output component 225 may include a component that provides output from the apparatus 200 (e.g., a display, a speaker, and/or one or more light-emitting diodes (LEDs), among other examples).

The communication interface 230 may include a transmission component and/or a reception component. For example, the communication interface 230 may include a transceiver and/or one or more separate receivers and/or transmitters that enable the apparatus 200 to communicate with other devices, such as via a wired connection, a wireless connection, or a combination of wired and wireless connections. In some aspects, the communication interface may include one or more radio frequency reflective elements and/or one or more radio frequency refractive elements. The communication interface 230 may permit the apparatus 200 to receive information from another apparatus and/or provide information to another apparatus. For example, the communication interface 230 may include an Ethernet interface, an optical interface, a coaxial interface, an infrared interface, an RF interface, a universal serial bus (USB) interface, a Wi-Fi interface, a cellular network interface, a wireless modem, an inter-integrated circuit (I²C), and/or a serial peripheral interface (SPI), among other examples.

The communication manager 235 may include hardware, software, or a combination of hardware and software configured to cause the apparatus 200 to perform one or more communication tasks associated with the communication manager 110 and/or the transceiver 112. In some aspects, the communication manager 235 may be, be similar to, include, or be included in, the communication manager 110 depicted in FIG. 1. In some aspects, the communication manager 235 may include the processor 210, the memory 215, the input component 220, the output component 225, the communication interface 230, and/or the machine learning component 240, and/or one or more aspects thereof.

In some aspects, the machine learning component 240 may include hardware, software, or a combination of hardware and software configured to cause the apparatus 200 to perform one or more machine learning tasks. For example, the machine learning component may include one or more machine learning models (e.g., classifiers, transformation matrices, and/or neural networks), one or more algorithms that employ the one or more machine learning models, and/or one or more datasets utilized in developing, training, validating, testing, and/or implementing the one or more machine learning models.

In some aspects, the apparatus 200 may include means for obtaining position information associated with a first subset of network node positions, of a set of network node positions, in connection with a map associated with a wireless coverage area, the position information indicating a subset of distance values of a set of distance values, wherein each distance value of the set of distance values corresponds to a distance between a UE position, of a set of UE positions, and a respective network node position of the set of network node positions; means for obtaining map information associated with the map, the map information indicating a subset of links, of a set of links, wherein each link of the subset of links includes a UE position of a subset of UE positions, of the set of UE positions, a network node position of the first subset of network node positions, and an estimated pathloss value, of a first subset of estimated pathloss values of a set of estimated pathloss values, between the UE position and the network node position; means for determining, based on a machine learning component, a first plurality of predicted pathloss values associated with a second subset of network node positions of the set of network node positions; means for training the machine learning component based on the first plurality of predicted pathloss values and a second subset of estimated pathloss values of the set of estimated pathloss values; means for determining, based on the machine learning component and a third subset of estimated pathloss values of the set of estimated pathloss values, a second plurality of predicted pathloss values; and/or means for performing a communication task associated with the wireless coverage area based on the second plurality of predicted pathloss values. In some aspects, the means for apparatus 200 to perform processes and/or operations described herein may include one or more components of apparatus 200 described in connection with FIG. 2, such as bus 205, processor 210, memory 215, input component 220, output component 225, communication interface 230, communication manager 235, and/or machine learning component 240.

As indicated above, FIG. 2 is provided as an example. Other examples may differ from what is described with regard to FIG. 2.

As described above, in some aspects, the network 108 depicted in FIG. 1 may include a cellular network that includes a RAT. While some aspects may be described herein using terminology commonly associated with a 5G or NR RAT, aspects of the present disclosure can be applied to other RATs, such as a 3G RAT, a 4G RAT, and/or a RAT subsequent to 5G (e.g., 6G).

Figure 3:
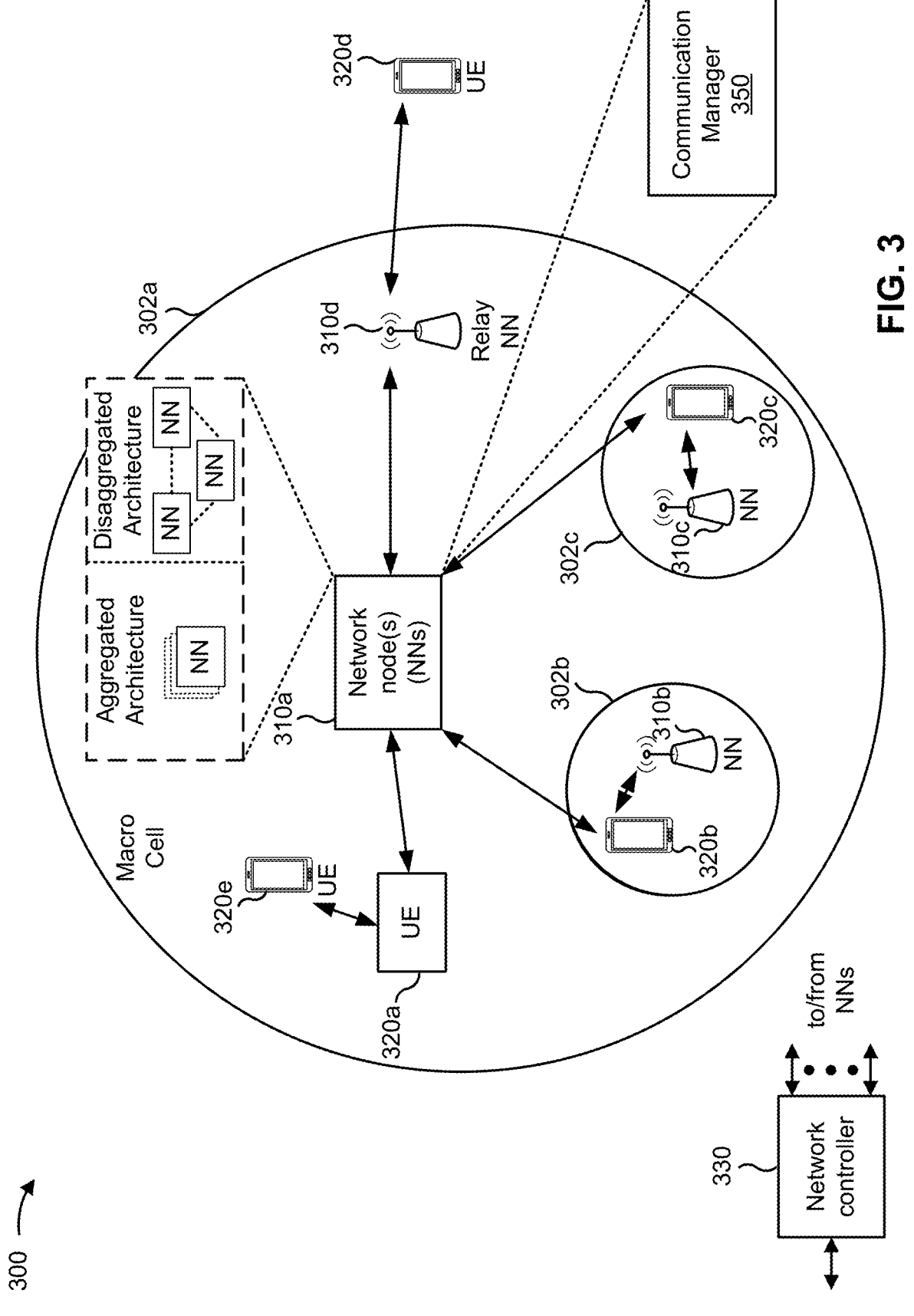
FIG. 3 is a diagram illustrating an example of a wireless network in accordance with the present disclosure.

FIG. 3 is a diagram illustrating an example of a wireless network 300 in accordance with the present disclosure. The wireless network 300 may be or may include elements of a 5G (or NR) network or a 6G network, among other examples. The wireless network 300 may include multiple network nodes 310 (also referred to as network entities), shown as a network node (NN) 310a, a network node 310b, a network node 310c, and a network node 310d. The network nodes 310 may support communications with multiple UEs 320, shown as a UE 320a, a UE 320b, a UE 320c, a UE 320d, and a UE 320e.

A network node 310 may include one or more devices that enable communication between a UE 320 and one or more components of the wireless network 300. A network node 310 may be, may include, or may be referred to as an NR network node, a 6G network node, a Node B, an eNB (for example, in 4G), a gNB (for example, in 5G), an access point (AP), a transmission reception point (TRP), a mobility element of a network, a core network node, a network element, a network equipment, and/or another type of device or devices included in a radio access network (RAN).

A network node 310 may be a single physical node or may be two or more physical nodes. For example, a network node 310 may be a device or system that implements part of a radio protocol stack, a device or system that implements a full protocol stack (such as a full gNB protocol stack), or a collection of devices or systems that collectively implement the full protocol stack. For example, and as shown, a network node 310 may be an aggregated network node, meaning that the network node 310 may use a radio protocol stack that is physically and logically integrated within a single node in the wireless network 300. For example, an aggregated network node 310 may consist of a single standalone base station or a single TRP that uses a full radio protocol stack to enable or facilitate communication between a UE 320 and a core network of the wireless network 300.

Alternatively, and as also shown, a network node 310 may be a disaggregated network node (sometimes referred to as a disaggregated base station), meaning that the network node 310 may use a protocol stack that is physically distributed and/or logically distributed among two or more nodes in the same geographic location or in different geographic locations. In some deployments, disaggregated network nodes 310 may be used in an integrated access and backhaul (IAB) network, in an open radio access network (O-RAN), such as the network configuration sponsored by the O-RAN Alliance, or in a virtualized radio access network (vRAN), also known as a cloud radio access network (C-RAN), to facilitate scaling of communication systems by separating base station functionality into multiple units that can be individually deployed.

The network nodes 310 of the wireless network 300 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A CU may handle user plane functionality (for example, Central Unit-User Plane (CU-UP) functionality), and/or control plane functionality (for example, Central Unit-Control Plane (CU-CP) functionality). A DU may host one or more of a radio link control (RLC) layer, a medium access control (MAC) layer, and/or one or more high physical (PHY) layers depending, at least in part, on a functional split, such as a functional split defined by the Third Generation Partnership Project (3GPP). In some examples, a DU may host one or more low PHY layer functions, such as a fast Fourier transform (FFT), an inverse FFT (iFFT), beamforming, physical random access channel (PRACH) extraction and filtering, and/or scheduling of resources for one or more UEs 320, among other examples. An RU may host RF processing functions or low PHY layer functions, such as an FFT, an iFFT, beamforming, or PRACH extraction and filtering, among other examples, based on a functional split, such as a lower layer functional split. In such an architecture, each RU can be operated to handle over the air (OTA) communication with one or more UEs 320.

In some aspects, a network node 310 may include a combination of one or more CUs, one or more DUs, one or more RUs, one or more IAB nodes, one or more Near-Real Time (Near-RT) RAN Intelligent Controllers (RICs), and/or one or more Non-Real Time (Non-RT) RICs in the wireless network 300. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as within a cloud deployment.

In some examples, a network node 310 may be, may include, or may operate as an RU, a TRP, or a base station that communicates with one or more UEs 320 via a radio access link (which may be referred to as a "Uu" link). The radio access link may include a downlink and an uplink. "Downlink" (or "DL") refers to a communication direction from a network node 310 to a UE 320, and "uplink" (or "UL") refers to a communication direction from a UE 320 to a network node 310. Downlink channels may include one or more control channels and one or more data channels. A downlink control channel may be used to transmit downlink control information (for example, scheduling information, reference signals, and/or configuration information) from a network node 310 to a UE 320. A downlink data channel may be used to transmit downlink data (for example, user data associated with a UE 320) from a network node 310 to a UE 320. Downlink control channels may include one or more physical downlink control channels (PDCCHs), and downlink data channels may include one or more physical downlink shared channels (PDSCHs). Uplink channels may include one or more control channels and one or more data channels. An uplink control channel may be used to transmit uplink control information (for example, reference signals and/or feedback corresponding to one or more downlink transmissions) from a UE 320 to a network node 310. An uplink data channel may be used to transmit uplink data (for example, user data associated with a UE 320) from a UE 320 to a network node 310. Uplink control channels may include one or more physical uplink control channels (PUCCHs), and uplink data channels may include one or more physical uplink shared channels (PUSCHs). The downlink and the uplink may each include a set of resources on which the network node 310 and the UE 320 may communicate.

In some examples, the wireless network 300 may be configured for half-duplex communications and/or full-duplex communications. In half-duplex communications, a network node 310 and/or a UE 320 may only transmit or receive communications in a particular time instance. For example, in half-duplex communication, a wireless communication device may perform only one of transmission or reception in a particular time instance. In full-duplex communications, a wireless communication device (such as the network node 310 and/or the UE 320) may transmit and receive communications simultaneously (for example, in the same time instance).

As described above, in some aspects, the wireless network 300 may be, may include, or may be included in an IAB network. In an IAB network, at least one network node (for example, network node 310) may be an anchor network node that communicates with a core network via a wired backhaul link, such as a fiber connection. An anchor network node may also be referred to as an IAB donor (or IAB-donor), a central entity, and/or a CU, among other examples. An IAB network may include one or more non-anchor network nodes, sometimes referred to as relay network nodes or IAB nodes (or IAB-nodes). The non-anchor network node may communicate directly with or indirectly with (for example, via one or more non-anchor network nodes) the anchor network node via one or more backhaul links to form a backhaul path to the core network for carrying backhaul traffic. Backhaul links may be wireless links. Anchor network nodes and/or non-anchor network nodes may communicate with one or more UEs (for example, UE 320) via access links, which may be wireless links for carrying access traffic.

An IAB network may include an IAB donor that connects to a core network via a wired connection (for example, a wireline backhaul). For example, an Ng interface of an IAB donor may terminate at a core network. Additionally, or alternatively, an IAB donor may connect to one or more devices of the core network that provide a core access and mobility management function (AMF). In some aspects, an IAB donor may include a network node 310, such as an anchor network node. An IAB donor may include a CU, which may perform access node controller (ANC) functions and/or AMF functions. The CU may configure a DU of the IAB donor and/or may configure one or more IAB nodes (for example, a mobile termination (MT) function and/or a DU function of an IAB node) that connect to the core network via the IAB donor. Thus, a CU of an IAB donor may control and/or configure the entire IAB network (or a portion thereof) that connects to the core network via the IAB donor, such as by using control messages and/or configuration messages (for example, an RRC configuration message or an F1 application protocol (F1AP) message). Access links may facilitate communications between a UE 320 and an IAB donor or between a UE 320 and an IAB node.

A link between an IAB donor and an IAB node or between two IAB nodes may be referred to as a backhaul link. A backhaul link may be a wireless backhaul link that provides an IAB node with radio access to a core network via an IAB donor, and optionally via one or more other IAB nodes. In an IAB network, network resources for wireless communications (such as time resources, frequency resources, and/or spatial resources) may be shared between access links and backhaul links. In some aspects, a backhaul link may be a primary backhaul link or a secondary backhaul link (e.g., a backup backhaul link). In some aspects, a secondary backhaul link may be used if a primary backhaul link fails, becomes congested, and/or becomes overloaded, among other examples.

When a first node controls and/or schedules communications for a second node (for example, when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. In some cases, in an IAB network, a DU may be referred to as a scheduling node or a scheduling component, and an MT may be referred to as a scheduled node or a scheduled component. A parent node may be an IAB donor or an IAB node, and a child node may be an IAB node or a UE 320.

Communications of an MT function of a child node may be controlled and/or scheduled by a parent node of the child node.

A network node 310 that relays communications may be referred to as a relay station, a relay network node, or a relay. A relay station may receive a transmission of data from an upstream station (for example, a network node 310 or a UE 320) and send a transmission of the data to a downstream station (for example, a UE 320 or a network node 310). In this case, the wireless network 300 may be referred to as a "multi-hop network." In the example shown in FIG. 3, the network node 310d (for example, a relay network node) may communicate with the network node 310a (for example, a macro network node) and the UE 320d in order to facilitate communication between the network node 310a and the UE 320d. Additionally or alternatively, a UE 320 may be or may operate as a relay station that can relay transmissions to or from other UEs 320. A UE 320 that relays communications may be referred to as a UE relay or a relay UE, among other examples.

The UEs 320 may be physically dispersed throughout the wireless network 300, and each UE 320 may be stationary or mobile. A UE 320 may be, may include, or may be included in an access terminal, a terminal, a mobile station, or a subscriber unit. A UE 320 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an extended reality (XR) device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

Some UEs 320 may be considered machine-type communication (MTC) or evolved or enhanced machine-type communication (eMTC) UEs (or further enhanced eMTC (feMTC), or enhanced feMTC (efeMTC), or further evolutions thereof). "MTC" can refer to eMTC, feMTC, efeMTC, or further evolutions thereof. An MTC UE may be, may include, or may be included in or coupled with a robot, a drone, a remote device, a sensor, a meter, a monitor, and/or a location tag. Some UEs 320 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 320 may be considered Customer Premises Equipment, which may include telecommunications devices that are installed at a customer location (such as a home or office) to enable access to a service provider's network (such as the wireless network 300).

Some UEs 320 may be classified according to different categories in association with different complexities and/or different capabilities. UEs 320 in a first category may facilitate massive IoT in the wireless network 300, and may offer low complexity and/or cost relative to UEs 320 in a second category. UEs 320 in a second category may include mission-critical IoT devices, legacy UEs, baseline UEs, high-tier UEs, advanced UEs, full-capability UEs, and/or premium UEs that are capable of ultra-reliable low-latency communication (URLLC), enhanced mobile broadband (eMBB), and/or precise positioning in the wireless network 300, among other examples. A third category of UEs 320 may have mid-tier complexity and/or capability (e.g., a capability between UEs 320 of the first category and UEs 320 of the second capability). A UE 320 of the third category may be referred to as a reduced capacity UE ("RedCap UE"), a mid-tier UE, an NR-Light UE, and/or an NR-Lite UE, among other examples. RedCap UEs may bridge a gap between capability and complexity of NB-IoT devices and/ or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart cities deployment, among other examples.

In some examples, a UE 320 in the third category (a RedCap UE) may support lower latency communication than a UE 320 in the first category (an NB-IoT UE or an eMTC UE), and a UE 320 in the second category (a mission-critical IoT UE or a premium UE) may support lower latency communication than the UE 320 in the third category. In some other examples, a UE 320 in the third category (a RedCap UE) may support higher wireless communication throughput than a UE 320 in the first category (an NB-IoT UE or an eMTC UE), and a UE 320 in the second category (a mission-critical IoT UE or a premium UE) may support higher wireless communication throughput than the UE 320 in the third category. In some other examples, a UE 320 in the first category (an NB-IoT UE or an eMTC UE) may support longer battery life than a UE 320 in the third category (a RedCap UE), and the UE 320 in the third category may support longer battery life than a UE 320 in the second category (a mission-critical IoT UE or a premium UE).

In some examples, a UE 320 of the third category (a RedCap UE) may have capabilities that satisfy device or performance requirements of a first wireless communication specification but not a second wireless communication specification, while a UE 320 of the second category (a mission-critical IoT UE or a premium UE) may have capabilities that satisfy device or performance requirements of the second wireless communication specification (and also the first wireless communication specification, in some cases). For example, a UE 320 of the third category may support a lower maximum modulation and coding scheme (MCS) (for example, a modulation scheme such as quadrature phase shift keying (QPSK)) than an MCS supported by a UE 320 of the second category (for example, a modulation scheme such as 256-quadrature amplitude modulation (QAM)). As another example, a UE of the third category may support a lower maximum transmit power than a maximum transmit power of a UE of the second category. As another example, a UE 320 of the third category may have a less advanced beamforming capability than a beamforming capability of a UE 320 of the second category (for example, a RedCap UE may not be capable of forming as many beams as a premium UE). As another example, a UE 320 of the third category may require a longer processing time than a processing time of a UE 320 of the second category. As another example, a UE 320 of the third category may include less hardware or less complex hardware (such as fewer antennas, fewer transmit antennas, and/or fewer receive antennas) than a UE 320 of the second category. As another example, a UE 320 of the first category may not be capable of communicating on as wide of a maximum BWP as a UE 320 of the second category.

In some examples, a UE 320 (such as a premium UE or a RedCap UE) may implement power saving features, such as for UEs 320 in a radio resource control (RRC) connected mode, an RRC idle mode, or an RRC inactive mode. Power saving features may include, for example, relaxed radio resource monitoring (such as for devices operating in low mobility or in good radio conditions), extended discontinuous reception (eDRX) for latency-tolerant devices, reduced PDCCH monitoring during active times, and power-efficient paging reception.

A UE 320 may include or may be included in a housing that houses components associated with the UE 320, such as one or more processor components and/or one or more memory components. One or more of the processor components may be coupled with one or more of the memory components and/or other components. For example, the processor components (for example, one or more processors) and the memory components (for example, a memory) may be operatively coupled, communicatively coupled, electronically coupled, or electrically coupled with one another.

In some aspects, two or more UEs 320 (for example, shown as UE 320*a* and UE 320*e*) may communicate directly with one another using one or more sidelink communications (for example, without communicating by way of a network node 310 as an intermediary). As an example, the UE 320*a* may directly transmit data, control information or other signaling as a sidelink communication to the UE 320*e*. This is in contrast to, for example, the UE 320*a* first transmitting data in an UL communication to a network node 310, which then transmits the data to the UE 320*e* in a DL communication. In various examples, the UEs 320 may communicate using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 310 may schedule and/or allocate resources for sidelink communications between UEs 320 in the wireless network 300. In some other deployments and configurations, a UE 320 (instead of a network node 310) may perform, or collaborate or negotiate with one or more other UEs to perform, scheduling operations, resource selection operations, and/or other operations described elsewhere herein for sidelink communications.

Downlink and uplink resources may include time domain resources (frames, subframes, slots, symbols), frequency domain resources (frequency bands, frequency carriers, subcarriers, resource blocks, resource elements), spatial domain resources (particular transmit directions or beam parameters), or a combination thereof. Frequency domain resources of some bands may be subdivided into bandwidth parts (BWPs). A BWP may be a continuous block of frequency domain resources (for example, a continuous block of resource blocks) that are allocated for one or more UEs 320. A UE 320 may be configured with both an uplink BWP and a downlink BWP. A BWP may be dynamically configured (e.g., by a network node 310 transmitting a dynamic control information (DCI) configuration to the one or more UEs 320) and/or reconfigured, which means that a BWP can be adjusted in real-time (or near-real-time) based on changing network conditions in the wireless network 300 and/or based on the specific requirements of the one or more UEs 320. This allows for more efficient use of the available frequency domain resources in the wireless network 300 in that smaller amounts of frequencies may be allocated to a BWP for a UE 320 (which may reduce the amount of frequencies that a UE 320 is required to monitor), leaving a greater amount of frequencies to be spread across multiple UEs 320. Thus, BWPs may also assist in the implementation of lower-capability UEs 320 by facilitating the configuration of smaller bandwidths for communication by such UEs 320.

BWPs may be configured as a subset or a part of total carrier bandwidth. A BWP forms a set of contiguous common resource blocks (CRBs) within the full component carrier bandwidth. In other words, within the carrier bandwidth, a BWP starts at a CRB and may span over a set of consecutive CRBs. Each BWP may be associated with its own numerology (indicating a sub-carrier spacing (SCS) and cycling prefix (CP)). A UE 320 may be configured with up to four downlink BWPs and up to four uplink BWPs for each serving cell. To enable reasonable UE battery consumption, only one BWP in the downlink and one BWP in the uplink are generally active at a given time on an active serving cell under typical operation. The active BWP defines the UE 320's operating bandwidth within the cell's operating bandwidth while all other BWPs that the UE 320 is configured with are deactivated. On deactivated BWPs, the UE 320 does not transmit or receive any data.

Some network nodes 310 (for example, a base station, an RU, or a TRP) may provide communication coverage for a particular geographic area. In the 3GPP, the term "cell" can refer to a coverage area of a network node 310 or a network node subsystem serving such a coverage area, depending on the context in which the term is used. A network node may support one or multiple (for example, three) cells. In some examples, a network node 310 may provide communication coverage for a macro cell, a pico cell, a femto cell, or another type of cell. A macro cell may cover a relatively large geographic area (for example, several kilometers in radius) and may allow unrestricted access by UEs 320 with service subscriptions. A pico cell may cover a relatively small geographic area and may allow unrestricted access by UEs 320 with service subscriptions. A femto cell may cover a relatively small geographic area (for example, a home) and may allow restricted access by UEs 320 having association with the femto cell (for example, UEs 320 in a closed subscriber group (CSG)). A network node 310 for a macro cell may be referred to as a macro network node. A network node 310 for a pico cell may be referred to as a pico network node. A network node 310 for a femto cell may be referred to as a femto network node or an in-home network node. As is evident, the wireless network 300 may be a heterogeneous network that includes network nodes 130 of different types, such as macro network nodes, pico network nodes, femto network nodes, relay network nodes, aggregated network nodes, and/or disaggregated network nodes, among other examples. In the example shown in FIG. 3, the network node 310a may be a macro network node for a macro cell 302a, the network node 310b may be a pico network node for a pico cell 302b, and the network node 310c may be a femto network node for a femto cell 302c.

Various different types of network nodes 310 may generally transmit at different power levels, serve different coverage areas, and/or have different impacts on interference in the wireless network 300 than other types of network nodes 310. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a cell may not necessarily be stationary, and the geographic area of the cell may move according to the location of a network node 310 that is mobile (for example, a mobile network node such as a train, a satellite base station, an unmanned aerial vehicle, or a non-terrestrial network (NTN) network node). A network node 310 may be a terrestrial network node 310 (for example, a terrestrial base station or entity of a disaggregated base station) or an NTN network node 310. For example, the wireless network 300 may include one or more NTN deployments in which a non-terrestrial wireless communication device may include a non-terrestrial network node or NTN network node 310 (or non-terrestrial network node 310) and/or a relay station (referred to herein, interchangeably, as a "non-terrestrial relay station"). An NTN may facilitate access to the wireless network 300 for remote areas that may not otherwise be within a coverage area of a terrestrial network node 310, such as over seas, oceans, or remote areas in which a terrestrial network is not deployed. An NTN may provide connectivity for various applications, including satellite communications, IoT, MTC, and/or other applications associated with high speed, low latency, and/or high reliability. A non-terrestrial wireless communication device may include a satellite, a manned aircraft system, an unmanned aircraft system (UAS) platform, and/or the like. A satellite may include a low-earth orbit (LEO) satellite, a medium-earth orbit (MEO) satellite, a geostationary earth orbit (GEO) satellite, and/or a high elliptical orbit (HEO) satellite, among other examples. A manned aircraft system may include an airplane, helicopter, and/or a dirigible, among other examples. A UAS platform may include a high-altitude platform station (HAPS), and may include a balloon, a dirigible, and/or an airplane, among other examples. An NTN network node 310 may be part of an NTN that is separate from the wireless network 300. Alternatively, an NTN network node 310 may be part of the wireless network 300.

An NTN network node 310 may communicate directly and/or indirectly with other entities in the wireless network 300 using NTN communication. The other entities may include UEs, NTN network nodes in the one or more NTN deployments, other types of network nodes (for example, stationary, terrestrial, or ground-based network nodes), relay stations, and/or one or more components and/or devices included in a core network of wireless network 300. For example, an NTN network node 310 may communicate with a UE 320 via a service link (for example, where the service link includes an access link). An NTN network node 310 may communicate with a gateway (for example, a terrestrial node providing connectivity for the NTN network node 310 to a data network or a core network) via a feeder link (for example, where the feeder link is associated with an N2 or an N3 interface). One NTN network node 310 may communicate with another NTN network node via an inter-satellite link (ISL). An NTN deployment may be transparent (for example, where the NTN network node 310 operates in a similar manner as a repeater or relay and/or where an access link does not terminate at the NTN network node 310) or regenerative (for example, where the NTN network node 310 regenerates a signal and/or where an access link terminates at the NTN network node 310).

In some examples, a UE 320 may operate in association with a discontinuous reception (DRX) configuration (for example, provided to the UE 320 by a network node 310). DRX operation may enable the UE 320 to sleep at various times while in the coverage area of a network node 310 to reduce power consumption for conserving battery resources, among other examples. The DRX configuration may configure the UE 320 operate in association with a DRX cycle. A DRX cycle may include a DRX on duration (a duration during which the UE 320 is awake or in an active state) and one or more opportunities to enter a DRX sleep mode in which the UE 320 may refrain from monitoring for communications from a network node 310. The UE 320 may also deactivate antennas, RF chains, and/or other hardware devices during the DRX sleep mode. The time during which the UE 320 is configured to be in the active state during a DRX on duration may be referred to as an active time, and the time during which the UE 320 is configured to be in a DRX sleep mode may be referred to as an inactive time. During a DRX on duration, the UE 320 may monitor for downlink communications from the network nodes 310. If the UE 320 does not detect and/or successfully decode any downlink communications during the DRX on duration, the UE 320 may enter a DRX sleep mode for the inactive time duration at the end of the DRX on duration. The UE 320 may repeat DRX cycles with a configured periodicity according to the DRX configuration. If the UE 320 detects and/or successfully decodes a downlink communication during the DRX on duration, the UE 320 may remain in the active mode for the duration of a DRX inactivity timer (which may extend the active time). The UE 320 may start the DRX inactivity timer at a time at which the downlink communication is received. The UE 320 may remain in the active mode until the DRX inactivity timer expires, at which time the UE 320 may transition to the sleep mode for an inactive time duration. In some examples, the UE 320 may use a DRX cycle referred to as an extended DRX (eDRX) cycle, such as for use cases that are tolerant to latency. An eDRX cycle may include a relatively longer inactive time (such as a lower ratio of active time to inactive time) relative to a baseline DRX cycle.

Devices (for example, UEs 320, network nodes 310) of the wireless network 300 may communicate using the electromagnetic spectrum, which may be subdivided by frequency or wavelength into various classes, bands, carriers, and/or channels. For example, devices of the wireless network 300 may communicate using one or more operating bands. In some aspects, multiple wireless networks 300 may be deployed in a given geographic area. Each wireless network 300 may support a particular radio access technology (RAT) (which may also be referred to as an air interface) and may operate on one or multiple carrier frequencies in one or multiple frequency ranges such as 410 MHz-7.125 GHz or 24.25 GHz-52.6 GHz, among other examples. Examples of RATs include a 4G RAT, a 5G/NR RAT, and/or a 6G RAT, among other examples. In some examples, when multiple RATs are deployed in a given geographic area, each RAT in the geographic area may operate on different frequencies in order to avoid interference with one another.

Various operating bands have been defined as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. An operating band for these mid-band frequencies may be referred to as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands may extend 5G NR operation, 6G operation, and/or other RATs beyond 52.6 GHz. For example, three higher operating bands may be referred to as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band. In some examples, wireless network 300 may implement dynamic spectrum sharing (DSS), in which multiple RATs (for example, 4G/LTE and 5G/NR) are implemented with dynamic bandwidth allocation (for example, based on user demand) in a single frequency band.

With the above examples in mind, unless specifically stated otherwise, the term "sub-6 GHz," if used herein, may broadly refer to frequencies that may be less than 6 GHz, may be within FR1, or may include mid-band frequencies. Further, unless specifically stated otherwise, the term "millimeter wave," if used herein, may broadly refer to frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein may be applicable to those modified frequency ranges.

In some aspects, a network node (e.g., the network node 310) may include a communication manager 350. As described in more detail elsewhere herein, the communication manager 350 may obtain position information associated with a first subset of network node positions, of a set of network node positions, in connection with a map associated with a wireless coverage area, the position information indicating a subset of distance values of a set of distance values, wherein each distance value of the set of distance values corresponds to a distance between a UE position, of a set of UE positions, and a respective network node position of the set of network node positions; obtain map information associated with the map, the map information indicating a subset of links, of a set of links, wherein each link of the subset of links includes a UE position of a subset of UE positions, of the set of UE positions, a network node position of the first subset of network node positions, and an estimated pathloss value, of a first subset of estimated pathloss values of a set of estimated pathloss values, between the UE position and the network node position; determine, based on a machine learning component, a first plurality of predicted pathloss values associated with a second subset of network node positions of the set of network node positions; train the machine learning component based on the first plurality of predicted pathloss values and a second subset of estimated pathloss values of the set of estimated pathloss values; determine, based on the machine learning component and a third subset of estimated pathloss values of the set of estimated pathloss values, a second plurality of predicted pathloss values; and perform a communication task associated with the wireless coverage area based on the second plurality of predicted pathloss values. Additionally, or alternatively, the communication manager 350 may perform one or more other operations described herein.

As indicated above, FIG. 3 is provided as an example. Other examples may differ from what is described with regard to FIG. 3.

Figure 4:
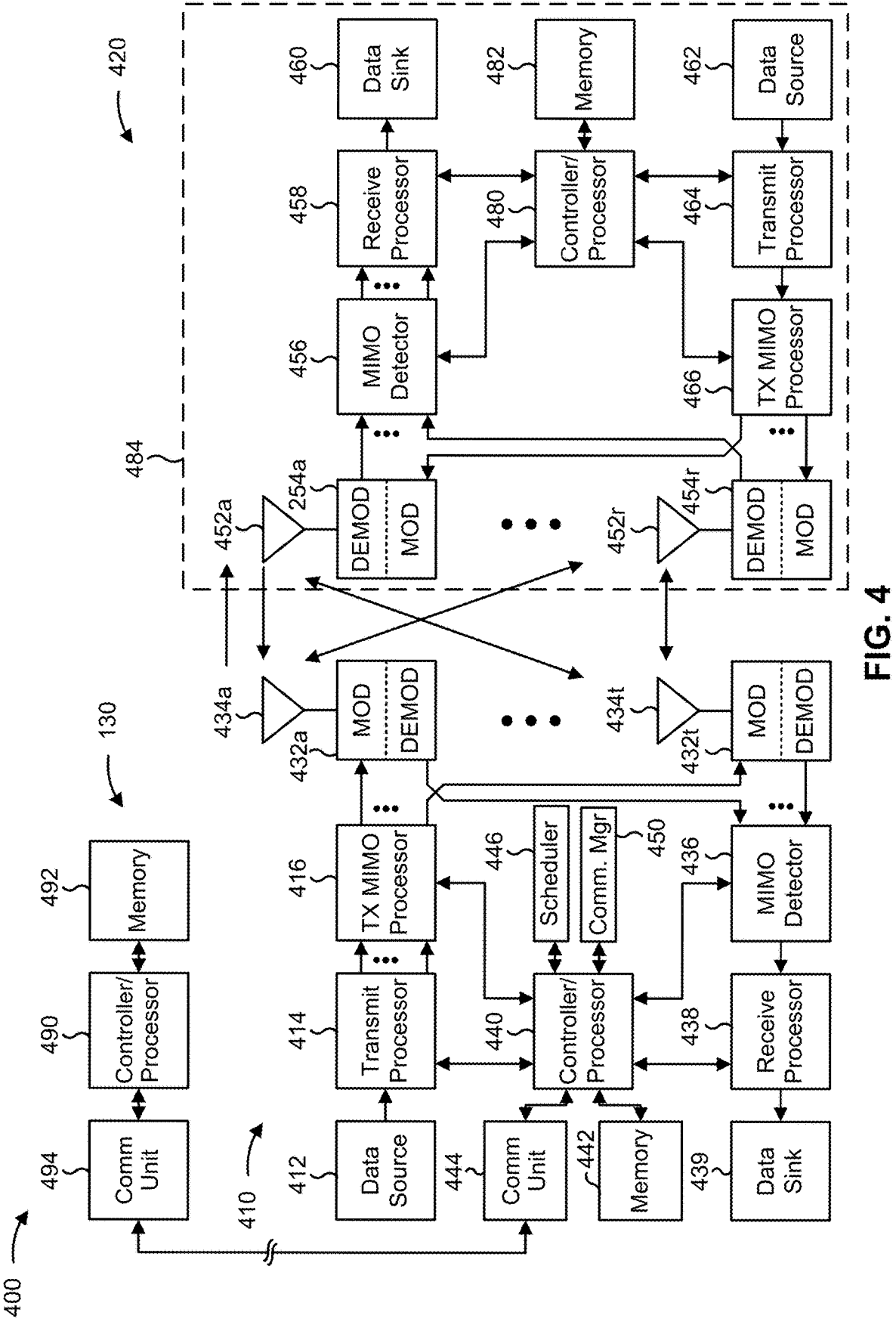
FIG. 4 is a diagram illustrating an example network node in communication with a user equipment (UE) in a wireless network in accordance with the present disclosure.

FIG. 4 is a diagram illustrating an example network node 410 in communication with a UE 420 in a wireless network in accordance with the present disclosure. The network node 410 of FIG. 4 may be an example of the network node 310 described with reference to FIG. 3. Similarly, the UE 420 may be an example of the UE 320 described with reference to FIG. 3.

As shown in FIG. 4, the network node 410 may include a data source 412, a transmit processor 414, a transmit (TX) multiple-input multiple-output (MIMO) processor 416, a set of modems 432 (such as 432a through 432t, where t≥1), a set of antennas 434 (such as 434a through 434t, where t≥1), a MIMO detector 436, a receive processor 438, a data sink 439, a controller/processor 440, a memory 442, a communication unit 444, and/or a scheduler 446, among other examples. In some aspects, one or a combination of the antenna(s) 434, the modem(s) 432, the MIMO detector 436, the receive processor 438, the transmit processor 414, or the TX MIMO processor 416 may be included in a transceiver of the network node 410. The transceiver may be used by a processor (for example, the controller/processor 440) and the memory 442 to perform aspects of the methods, processes or operations described herein. The term "controller/processor" may refer to one or more controllers and/or one or more processors. For example, reference to "a/the processor," "a/the controller/processor," or the like (in the singular) should be understood to refer to any one or more of the processors described in connection with FIG. 4 (e.g., a single processor or a combination of multiple different processors). Similarly, reference to "a/the memory" should be understood to refer to any one or more memories of the corresponding device or node (e.g., a single memory or a combination of multiple different memories). In some aspects, the network node 410 may include an interface, a communication component, or another component that facilitates communication with the UE 420 or another network node.

For downlink communication, the transmit processor 414 may receive data ("downlink data") from the data source 412 (such as a data pipeline or a data queue). The data is intended for the UE 420 (or a set of UEs 120). In some examples, the transmit processor 414 may select one or more MCSs for the UE 420 in accordance with one or more channel quality indicators (CQIs) received from the UE 420. The network node 410 may process the data (for example, including encoding the data) for transmission to the UE 420 on a downlink in accordance with the MCS(s) selected for the UE 420 to generate data symbols. The transmit processor 414 may process system information (for example, for semi-static resource partitioning information (SRPI)) and control information (for example, CQI requests, grants, or upper layer signaling) and provide overhead symbols and control symbols. The transmit processor 414 may generate reference symbols for reference signals (for example, a cell-specific reference signal (CRS), a demodulation reference signal (DMRS), or a channel state information (CSI) reference signal (CSI-RS)) and synchronization signals (for example, a primary synchronization signal (PSS) or a secondary synchronization signals (SSS)).

The TX MIMO processor 416 may perform spatial processing (for example, precoding) on the data symbols, the control symbols, the overhead symbols, or the reference symbols, if applicable, and may provide a set of output symbol streams (for example, T output symbol streams) to the set of modems 432. For example, each output symbol stream may be provided to a respective modulator component (shown as MOD) of a modem 432. Each modem 432 may use the respective modulator component to process (for example, to modulate) a respective output symbol stream (for example, for orthogonal frequency division multiplexing ((OFDM)) to obtain an output sample stream. Each modem 432 may further use the respective modulator component to process (for example, convert to analog, amplify, filter, or upconvert) the output sample stream to obtain a time domain downlink signal. The modems 432a through 432t may together transmit a set of downlink signals (for example, T downlink signals) via the corresponding set of antennas 434.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless network. A data stream (for example, from the data source 412) may be encoded into multiple TBs for transmission over the air interface. The quantity of TBs used for carrying the data associated with a particular data stream may be associated with a TB size common to the multiple TBs. The TB size may be based on or otherwise associated with radio channel conditions on the air interface, the MCS used for encoding the data, the downlink resources allocated for transmitting the data, and/or another parameter. In general, the larger the TB size, the greater the amount of data that can be transmitted in a single transmission, which reduces signaling overhead. Larger TB sizes may be more prone to transmission and/or reception errors than smaller TB sizes, but such errors may be mitigated by more robust error correction techniques.

For uplink communication, uplink signals from a UE 420 or other UEs may be received by an antenna 434, may be processed by a modem 432 (for example, a demodulator component, shown as DEMOD, of a modem 432), may be detected by the MIMO detector 436 (for example, a receive (Rx) MIMO processor) if applicable, and/or may be further processed by the receive processor 238 to obtain decoded data and control information sent by the UE 420. The receive processor 438 may provide the decoded data to a data sink 439 (which may be a data pipeline, a data queue, and/or another data sink) and provide the decoded control information to the controller/processor 440.

One or more antennas of the set of antennas 434 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 4. As used herein, "antenna" can refer to one or more antennas, one or more antenna panels, one or more antenna groups, one or more sets of antenna elements, or one or more antenna arrays.

In some examples, each of the antenna elements of an antenna 434 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (e.g., which may form a beam). For example, given an expected range of wavelengths or frequencies, the spacing may provide a quarter wavelength, half wavelength, or other fraction of a wavelength of spacing between neighboring antenna elements to allow for the desired constructive and destructive interference patterns of signals transmitted by the separate antenna elements within that expected range.

The amplitudes and/or phase of signals transmitted via antenna elements and/or sub-elements may be modulated and shifted relative to each other so as to generate one or more beams. "Beam" may, at a basic level, refer to a directional transmission of a wireless signal toward a receiving device or otherwise in a desired direction. "Beam" may also generally refer to a direction associated with such a directional signal transmission, a set of directional resources associated with the signal transmission (e.g., angle of arrival, horizontal direction, and/or vertical direction), and/ or a set of parameters that indicate one or more aspects of a directional signal, a direction associated with the signal, and/or a set of directional resources associated with the signal. Beamforming includes generation of a beam using multiple signals on different antenna elements, where one or more, or all, of the multiple signals are shifted in phase relative to each other. In some implementations, antenna elements may be individually selected or deselected for transmission of a signal (or signals) by controlling amplitudes of one or more corresponding amplifiers and/or phases to form a beam. The shape of a beam (such as the amplitude, width, and/or presence of side lobes) and/or the direction of a beam (such as an angle of the beam relative to a surface of an antenna array) can be dynamically controlled by modifying the phase shifts or phase offsets of the multiple signals relative to each other.

Different UEs 420 may include different numbers of antenna elements. For example, a UE may include a single antenna element, 2 antenna elements, 4 antenna elements, 8 antenna elements, or a different number of antenna elements. Generally, a larger number of antenna elements may provide increased control over parameters of beam generation relative to a smaller number of antenna elements, whereas a smaller number of antenna elements may be simpler to implement and may use less power than a larger number of antenna elements. Multiple antenna elements may support multiple-layer transmission, in which a first layer of a communication (which may include a first data stream) is transmitted using a first set of antenna elements and a second layer of a communication (which may include a second data stream) is transmitted using a second set of antenna elements.

For beamforming, the network node 410 may provide the UE 420 with a configuration of transmission configuration indicator (TCI) states that respectively indicate or correspond to beams that may be used by the UE 420, such as for receiving a PDSCH. For example, the network node 410 may indicate an activated TCI state to the UE 420, which the UE 420 may use to generate a beam for receiving the PDSCH.

A beam indication (an indication of a beam) may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a qcl-Type1, qcl-Type2, qcl-TypeA, qcl-TypeB, qcl-TypeC, qcl-TypeD, and/or the like), a cell identification (e.g., a Serv-CellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink/ uplink beam indication in a unified TCI framework. In some cases, the network may support a layer 1 (L1)-based beam indication using at least UE-specific (unicast) DCI to indicate joint or separate DL/UL beam indications from active TCI states. In some cases, existing DCI formats 1_1 and/or 1_2 may be reused for beam indication. The network node 410 may include a support mechanism for the UE 420 to acknowledge successful decoding of a beam indication. For example, the acknowledgment/negative acknowledgment of the PDSCH scheduled by the DCI carrying the beam indication may be also used as an ACK for the DCI.

Beam indications may be provided for carrier aggregation scenarios. In a unified TCI framework, information the network may support common TCI state ID update and activation to provide common QCL and/or common UL transmission spatial filter or filters across a set of configured component carriers. This type of beam indication may apply to intra-band CA, as well as to joint DL/UL and separate DL/UL beam indications. The common TCI state ID may imply that one reference signal determined according to the TCI state(s) indicated by a common TCI state ID is used to provide QCL Type-D indication and to determine UL transmission spatial filters across the set of configured CCs.

Further efficiencies in throughput, signal strength, and/or other signal properties may be achieved through beam refinement. The network node 410 may be capable of communicating with the UE 420 using beams of varying beam widths. For example, the network node 410 may be configured to utilize a wider beam when communicating with the UE 420 when the UE 420 is in motion because of the wider coverage needed to ensure that the UE 420 remains in coverage of the network node 410 when moving. The network node 410 may use a narrower beam when communicating with the UE 420 when the UE 420 is stationary because the network node 410 can reliably focus coverage on the UE 420 with low or minimal likelihood of the UE 420 moving out of the coverage area of the network node 410. In some examples, to select a particular beam for communication with a UE 420, the base station may transmit a reference signal, such as a SSB or CSI-RS, on each of a plurality of beams in a beam-sweeping manner. In some examples, SSBs may be transmitted on the wider beams, whereas CSI-RSs may be transmitted on the narrower beams. The UE 420 may measure the RSRP or the SINR on each of the beams and transmit a beam measurement report (e.g., a Layer 1 (L1) measurement report) to the network node 410 indicating the RSRP or SINR of one or more of the measured beams. The network node 410 may then select the particular beam for communication with the UE 420 based on the L1 measurement report. In other examples, when the channel is reciprocal, the network node 410 may derive the particular beam to communicate with the UE 420 based on uplink measurements of one or more uplink reference signals, such as an SRS.

One enhancement for multi-beam operation in a higher carrier frequency is facilitation of efficient (e.g., low latency and low overhead) downlink and/or uplink beam management to support higher Layer 1 and/or Layer 2 (L1/L2)-centric inter-cell mobility. Accordingly, one goal for L1/L2-centric inter-cell mobility is to enable a UE to perform a cell switch via dynamic control signaling at lower layers (e.g., DCI for L1 signaling or a medium access control (MAC) control element (MAC CE) for L2 signaling) rather than semi-static Layer 3 (L3) RRC signaling in order to reduce latency, reduce overhead, and/or otherwise increase efficiency of the cell switch. L1 and/or L2 signaling may be referred to as "lower layer" signaling and may be used to activate and/or deactivate candidate cells in a set of cells configured for L1/L2 mobility and/or to provide reference signals for measurement by the UE 420, by which the UE 420 may select a candidate beam as a target beam for a lower layer handover operation.

In some examples, for a UE 420, UL transmission may be performed using one antenna panel, and DL reception may be performed using another antenna panel. In some examples, full-duplex communication may be conditional on a beam separation of the UL beam and DL beam at the respective antenna panels. Utilizing full-duplex communication may provide a reduction in latency, such that it may be possible to receive a DL signal in UL-only slots, which may enable latency savings. In addition, full-duplex communication may enhance spectrum efficiency per cell or per UE 420, and may allow for a more efficient utilization of resources. Beam separation of the UL and DL beams assists in limiting or reducing self-interference that may occur during full duplex communication. It may be desirable to select UL and DL beams that are on different antenna panels to minimize self-interference. Determining the UL and DL beams that are separated on their respective antenna panels may provide a reliable full duplex communication by facilitating selection of beam pairs that minimize or reduce self-interference.

A full-duplex UE 420 may perform a self-interference measurement (SIM) procedure in order to identify self-interference from transmissions of the full-duplex UE 420. A full-duplex network node 410 also may perform a SIM procedure in order to identify self-interference from transmissions of the full-duplex network node 410. The UE 420 may provide a measurement report to the network node 410 to indicate results of the UE SIM. The network node 410 may select pairs of beams (referred to herein as "beam pairs") for the UE ("UE beam pairs") 420 and the network node ("network node beam pairs") 410 to use during full-duplex communications. A beam pair may include a UL beam and a DL beam. In some aspects, a beam pair may include a receive (Rx) beam and a transmit (Tx) beam.

The network node 410 may use the scheduler 446 to schedule one or more UEs 420 for downlink or uplink communications. In some aspects, the scheduler 446 may use DCI to dynamically schedule transmissions to the UE 420 and/or transmissions from the UE 420. In some aspects, the scheduler 446 may use an RRC configuration (e.g., a semi-static configuration) to perform semi-persistent sched-uling (SPS) or to configure a configured grant (CG) for a UE 420, where the scheduler 446 may allocate recurring time domain resources and/or frequency domain resources that the UE 420 may use to transmit and/or receive communications in the wireless network 300.

One or more of the transmit processor 414, the TX MIMO processor 416, the modem 432, the antenna 434, the MIMO detector 436, the receive processor 438, and/or the controller/processor 440 may be included in an RF chain of the network node 410. An RF chain may include filters, mixers, oscillators, amplifiers, analog-to-digital converters (ADCs), and/or other devices that convert between an analog signal (such as for transmission or reception on an air interface) and a digital signal (such as for processing by one or more processors of the network node 410). In some aspects, the RF chain may be or may be included in a transceiver of the network node 410.

In some examples, the network node 410 may use the communication unit 444 to communicate with a core network or other network nodes. The communication unit 444 may support wired and/or wireless communication protocols and/or connections such as Ethernet, optical fiber, common public radio interface (CPRI), and/or a wired or wireless backhaul, among other examples. The network node 410 may use the communication unit 444 to transmit and/or receive data associated with the UE 420 or to perform network control signaling, among other examples. The communication unit 444 may include a transceiver and/or an interface such as a network interface.

The UE 420 may include a set of antennas 452 (shown as antennas 452a through 452r, where r≥1), a set of modems 454 (shown as modems 454a through 454r, where r≥1), a MIMO detector 456, a receive processor 458, a data sink 460, a data source 462, a transmit processor 464, a TX MIMO processor 466, a controller/processor 480, and/or a memory 482. One or more of the components of the UE 420 may be included in a housing 484. In some aspects, one or a combination of the antenna(s) 452, the modem(s) 454, the MIMO detector 456, the receive processor 458, the transmit processor 464, or the TX MIMO processor 466 may be included in a transceiver that is included in the UE 420. The transceiver may be used by a processor (for example, the controller/processor 480) and the memory 482 to perform aspects of any of the methods described herein. The term "controller/processor" may refer to one or more controllers and/or one or more processors. For example, reference to "a/the processor," "a/the controller/processor," or the like (in the singular) should be understood to refer to any one or more of the processors described in connection with FIG. 4 (e.g., a single processor or a combination of multiple different processors). Similarly, reference to "a/the memory" should be understood to refer to any one or more memories of the corresponding device or node (e.g., a single memory or a combination of multiple different memories). In some aspects, the UE 420 may include another interface, another communication component, and/or another component that facilitates communication with the network node 410 and/or another UE 420.

One or more antennas of the set of antennas 452 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 4. In some examples, each of the antenna elements of an antenna 434 may include one or more sub-elements for radiating or receiving radio frequency signals. As used herein, "antenna" can refer to one or more antennas, one or more antenna panels, one or more antenna groups, one or more sets of antenna elements, or one or more antenna arrays.

For downlink communication, the set of antennas 452 may receive the downlink communications or signals from the network node 410 and may provide a set of received downlink signals (for example, R received signals) to the set of modems 454. For example, each received signal may be provided to a respective demodulator component (shown as DEMOD) of a modem 454. Each modem 454 may use the respective demodulator component to condition (for example, filter, amplify, downconvert, or digitize) a received signal to obtain input samples. Each modem 454 may use the respective demodulator component to further demodulate or process the input samples (for example, for OFDM) to obtain received symbols. The MIMO detector 456 may obtain received symbols from the set of modems 454, may perform MIMO detection on the received symbols if applicable, and may provide detected symbols. The receive processor 458 may process (for example, decode) the detected symbols, may provide decoded data for the UE 420 to a data sink 460 (such as data a data pipeline, a data queue, or an application executed on the UE 420), and may provide decoded control information and system information to a controller/processor 480.

For uplink communication, the transmit processor 464 may receive and process data ("uplink data") from a data source 462 (such as data a data pipeline, a data queue, or an application executed on the UE 420) and control information from the controller/processor 480. The control information may include one or more parameters, feedback, one or more signal measurements, and/or other types of control information. In some aspects, the receive processor 458 and/or the controller/processor 480 may determine one or more parameters for a received signal (such as received from the network node 410 or another UE), such as a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, and/or another parameter. The control information may facilitate parameter selection and/or scheduling for the UE 420 by the network node 410.

The transmit processor 464 may generate reference symbols for one or more reference signals, such as an uplink DMRS, an uplink SRS, and/or another type of reference signal. The symbols from the transmit processor 464 may be precoded by the TX MIMO processor 466 if applicable, further processed by the set of modems 454 (for example, for DFT-s-OFDM or CP-OFDM). The TX MIMO processor 466 may perform spatial processing (for example, precoding) on the data symbols, the control symbols, the overhead symbols, and/or the reference symbols, if applicable, and may provide a set of output symbol streams (for example, R output symbol streams) to the set of modems 454. For example, each output symbol stream may be provided to a respective modulator component (shown as MOD) of a modem 454. Each modem 454 may use the respective modulator component to process (for example, to modulate) a respective output symbol stream (for example, for OFDM) to obtain an output sample stream. Each modem 454 may further use the respective modulator component to process (for example, convert to analog, amplify, filter, or upconvert) the output sample stream to obtain an uplink signal.

The modems 454a through 454r may transmit a set of uplink signals (for example, R downlink signals) via the corresponding set of antennas 452. An uplink signal may include an uplink control information (UCI) communication, a MAC-CE communication, an RRC communication or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), or a physical sidelink feedback channel (PSFCH).

In some examples, the uplink communication or the downlink communication may include a MIMO communication. "MIMO" generally refers to transmitting and receiving multiple data signals (such as multiple layers or multiple data streams) simultaneously over a radio channel. MIMO may exploit multipath propagation. MIMO may be implemented using spatial processing referred to as precoding, or using spatial multiplexing. In some examples, MIMO may support simultaneous transmission to multiple receivers, referred to as multi-user MIMO (MU-MIMO). Some RATs may employ advanced MIMO techniques, such as multiple TRP operation (including redundant transmission or reception on multiple TRPs), reciprocity in the time domain or the frequency domain, single-frequency-network (SFN) transmission, or non-coherent joint transmission (NC-JT).

The controller/processor 440 of the network node 410, the controller/processor 480 of the UE 420, or any other component(s) of FIG. 4 may implement one or more techniques or perform one or more operations associated with pathloss prediction using a machine learning component, as described in more detail elsewhere herein. For example, the controller/processor 440 of the network node 410, the controller/processor 480 of the UE 420, or any other component(s) of FIG. 4 may perform or direct operations of, for example, process 1100 shown in FIG. 11, or other processes as described herein. The memory 442 and the memory 482 may store data and program codes for the network node 410 and the UE 420, respectively. In some examples, the memory 442 or the memory 482 may include a non-transitory computer-readable medium storing a set of instructions (for example, code or program code) for wireless communication. The memory 442 may include one or more memories, such as a single memory or multiple different memories (of the same type or of different types). The memory 482 may include one or more memories, such as a single memory or multiple different memories (of the same type or of different types). For example, the set of instructions, when executed (for example, directly, or after compiling, converting, or interpreting) by one or more processors of the network node 410 or the UE 420, may cause the one or more processors to perform process 1100 shown in FIG. 11, or other processes as described herein. In some examples, executing instructions may include running the instructions, converting the instructions, compiling the instructions, or interpreting the instructions, among other examples.

In some aspects, a network node (e.g., the network node 410) includes means for obtaining position information associated with a first subset of network node positions, of a set of network node positions, in connection with a map associated with a wireless coverage area, the position information indicating a subset of distance values of a set of distance values, wherein each distance value of the set of distance values corresponds to a distance between a user equipment (UE) position, of a set of UE positions, and a respective network node position of the set of network node positions; means for obtaining map information associated with the map, the map information indicating a subset of links, of a set of links, wherein each link of the subset of links includes a UE position of a subset of UE positions, of the set of UE positions, a network node position of the first subset of network node positions, and an estimated pathloss value, of a first subset of estimated pathloss values of a set of estimated pathloss values, between the UE position and the network node position; means for determining, based on a machine learning component, a first plurality of predicted pathloss values associated with a second subset of network node positions of the set of network node positions; means for training the machine learning component based on the first plurality of predicted pathloss values and a second subset of estimated pathloss values of the set of estimated pathloss values; means for determining, based on the machine learning component and a third subset of estimated pathloss values of the set of estimated pathloss values, a second plurality of predicted pathloss values; and/or means for performing a communication task associated with the wireless coverage area based on the second plurality of predicted pathloss values. The means for the network node to perform operations described herein may include, for example, one or more of communication manager 450, transmit processor 414, TX MIMO processor 416, modem 432, antenna 434, MIMO detector 436, receive processor 438, controller/processor 440, memory 442, or scheduler 446.

As indicated above, FIG. 4 is provided as an example. Other examples may differ from what is described with regard to FIG. 4.

Figure 5:
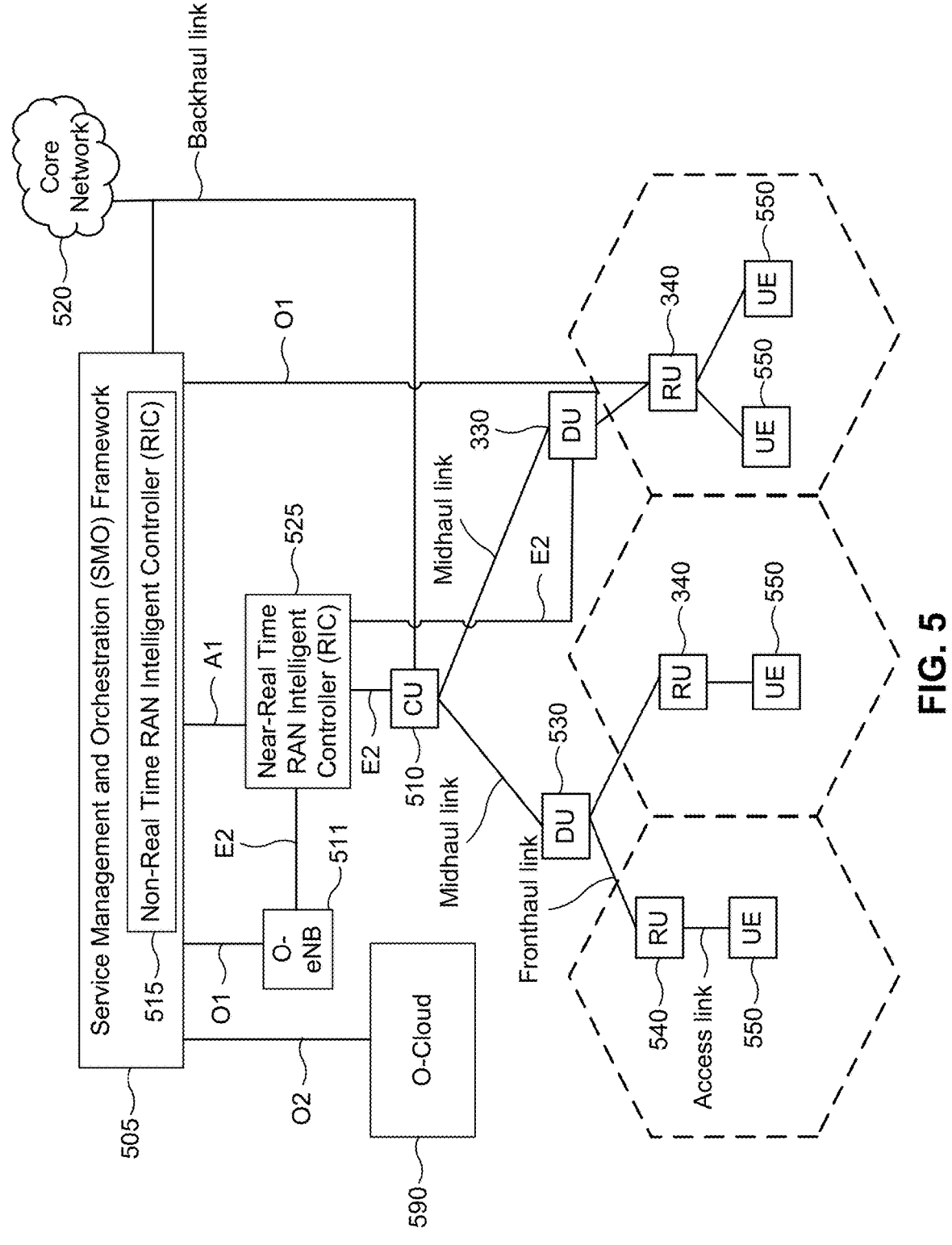
FIG. 5 is a diagram illustrating an example disaggregated base station architecture in accordance with the present disclosure.

FIG. 5 is a diagram illustrating an example disaggregated base station architecture 500 in accordance with the present disclosure. One or more components of the example disaggregated base station architecture 500 may be, include, or be included in, one or more network nodes (such one or more of network nodes 102, 204, 106, 310, or 410). The disaggregated base station architecture 500 may include a CU 510 that can communicate directly with a core network 520 via a backhaul link, or indirectly with the core network 520 through one or more disaggregated control units (such as a Near-RT RIC 525 via an E2 link, or a Non-RT RIC 515 associated with a Service Management and Orchestration (SMO) Framework 505, or both). The CU 510 may communicate with one or more DUs 530 via respective midhaul links, such as through F1 interfaces. Each of the DUs 530 may communicate with one or more RUs 540 via respective fronthaul links. Each of the RUs 540 may communicate with one or more UEs 550 via respective RF access links. In some deployments, a UE 550 may be simultaneously served by multiple RUs 540.

Each of the components of the disaggregated base station architecture 500, including the CUs 510, the DUs 530, the RUs 540, as well as the Near-RT RICs 525, the Non-RT RICs 515, and the SMO Framework 505, may include one or more interfaces or be coupled with one or more interfaces for receiving or transmitting signals, data, or information (collectively, signals) via a wired or wireless transmission medium.

In some aspects, the CU 510 may host one or more higher layer control functions. Such control functions can include radio resource control (RRC) functions, packet data convergence protocol (PDCP) functions, or service data adaptation protocol (SDAP) functions, among other examples. Each control function can be implemented with an interface for communicating signals with other control functions hosted by the CU 510. The CU 510 may handle user plane functionality (for example, Central Unit-User Plane (CU-UP) functionality), and/or control plane functionality (for example, Central Unit-Control Plane (CU-CP) functionality). In some implementations, the CU 510 can be logically split into one or more CU-UP units and one or more CU-CP units. A CU-UP unit can communicate bidirectionally with a CU-CP unit via an interface, such as the E1 interface when implemented in an O-RAN configuration. The CU 510 can be deployed to communicate with one or more DUs 530, as necessary, for network control and signaling.

Each DU 530 may correspond to a logical unit that includes one or more base station functions to control the operation of one or more RUs 540. In some aspects, the DU 530 may host one or more of a radio link control (RLC) layer, a MAC layer, and one or more high physical (PHY) layers depending, at least in part, on a functional split, such as a functional split defined by the 3GPP. In some implementations, the one or more high PHY layers may be implemented by one or more modules for forward error correction (FEC) encoding and decoding, scrambling, and modulation and demodulation, among other examples. In some implementations, the DU 530 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface for communicating signals with other layers (and modules) hosted by the DU 530, or with the control functions hosted by the CU 510.

Each RU 540 may implement lower-layer functionality. In some deployments, an RU 540, controlled by a DU 530, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 5GPP), such as a lower layer functional split. In such an architecture, each RU 540 can be operated to handle over the air (OTA) communication with one or more UEs 120. In some implementations, real-time and non-real-time aspects of control and user plane communication with the RU(s) 540 can be controlled by the corresponding DU 530. In some deployments, this configuration can enable each DU 530 and the CU 510 to be implemented in a cloud-based RAN architecture, such as a vRAN architecture.

The SMO Framework 505 may support RAN deployment and provisioning of non-virtualized and virtualized network elements. For non-virtualized network elements, the SMO Framework 505 may support the deployment of dedicated physical resources for RAN coverage requirements, which may be managed via an operations and maintenance interface (such as an O1 interface). For virtualized network elements, the SMO Framework 505 may interact with a cloud computing platform (such as an open cloud (O-Cloud)

platform 590) to perform network element life cycle management (such as to instantiate virtualized network elements) via a cloud computing platform interface (such as an O2 interface). Such virtualized network elements can include, but are not limited to, CUs 510, DUs 530, RUs 540, non-RT RICs 515, and Near-RT RICs 525. In some implementations, the SMO Framework 505 can communicate with a hardware aspect of a 4G RAN, a 5G NR RAN, and/or a 6G RAN, such as an open eNB (O-eNB) 511, via an O1 interface. Additionally, in some implementations, the SMO Framework 505 can communicate directly with each of one or more RUs 540 via a respective O1 interface. The SMO Framework 505 also may include a Non-RT RIC 515 that supports functionality of the SMO Framework 505.

The Non-RT RIC 515 may include or implement a logical function that enables non-real-time control and optimization of RAN elements and resources, Artificial Intelligence/Machine Learning (AI/ML) workflows including model training and updates, or policy-based guidance of applications/features in the Near-RT RIC 525. The Non-RT RIC 515 may be coupled to or communicate with (such as via an A1 interface) the Near-RT RIC 525. The Near-RT RIC 525 may include or implement a logical function that enables near-real-time control and optimization of RAN elements and resources via data collection and actions over an interface (such as via an E2 interface) connecting one or more CUs 510, one or more DUs 530, or both, as well as an O-eNB, with the Near-RT RIC 525.

In some implementations, to generate AI/ML models to be deployed in the Near-RT RIC 525, the Non-RT RIC 515 may receive parameters or external enrichment information from external servers. Such information may be utilized by the Near-RT RIC 525 and may be received at the SMO Framework 505 or the Non-RT RIC 515 from non-network data sources or from network functions. In some examples, the Non-RT RIC 515 or the Near-RT RIC 525 may tune RAN behavior or performance. For example, the Non-RT RIC 515 may monitor long-term trends and patterns for performance and employ AI/ML models to perform corrective actions through the SMO Framework 505 (such as reconfiguration via an O1 interface) or via creation of RAN management policies (such as A1 interface policies).

As indicated above, FIG. 5 is provided as an example. Other examples may differ from what is described with regard to FIG. 5.

Channel models can be developed to determine locations for deploying network nodes and to be used in positioning operations associated with network nodes and UEs. For example, ray tracing can be used to develop 3D urban micro (UMi) and 3D urban macro (UMa) channel models for urban environments in which buildings (and other structures) and foliage can cause signal attenuation.

Figure 6:
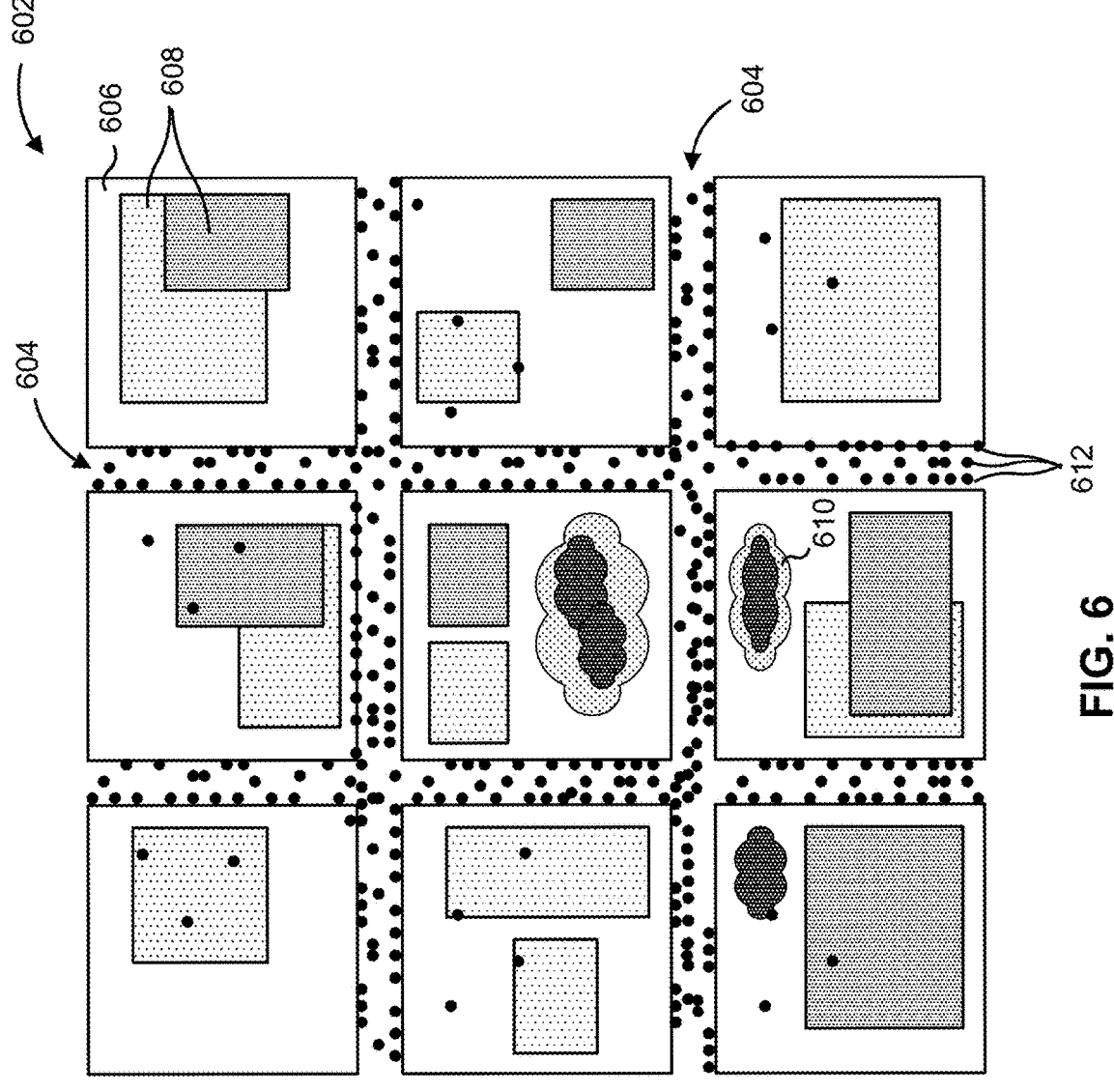
FIG. 6 is a diagram illustrating an example associated with channel model development for a wireless network, in accordance with the present disclosure.

FIG. 6 is a diagram illustrating an example 600 associated with channel model development for a wireless network, in accordance with the present disclosure. As shown in FIG. 6, a map 602 of an urban wireless environment may be developed (e.g., using ray tracing or other similar technique) that includes representations of geographical features such as roads 604, city blocks 606, buildings 608, and foliage 610. In some cases, the representations of the buildings and/or foliage may be depicted with different fills to indicate different heights of the buildings and/or foliage. For example, a darker fill (for example, a fill using more dense dots) may indicate a taller structure and a lighter fill may indicate a shorter structure. In some aspects, particular fills may be associated with particular height ranges.

As shown, the map 602 also may indicate a set of neural network node positions 612. In some cases, a wireless communication standard may specify algorithms for determining distance and pathloss based on a look-up associated with a ray tracing data set. "Ray tracing" is a method of rendering that simulates the physical behavior of a ray, such as a ray of light. Ray tracing can be useful for simulating the operation of a RAN because radio waves behave similarly to the rays rendered in a ray tracing simulation. However, in some cases, the standard may not include environmental data and may not be designed for pathloss prediction. Moreover, ray tracing in large network deployments can result in complex models that lead to computational burdens when being used to predict locations of new network nodes and/or to determine positions of existing network nodes.

Various aspects relate generally to using machine learning for predicting pathloss values associated with links between UEs and network nodes. Some aspects more specifically relate to using a portion of a dataset developed using ray tracing or other techniques to predict pathloss associated with network node positions and UE positions. In some examples, the dataset may include a set of network node positions, a set of UE positions, and a set of distance vectors. Each distance vector may include a direction component that indicates a direction of a signal traveling between a network node position and a UE position, as well as a distance value indicating the distance between the two positions. In some examples, a network node may obtain position information that includes a first subset of the set of distance vectors and map information associated with a map associated with a wireless coverage area that includes a first subset of the network node positions and a first subset of the UE positions. The map information also may include a subset of links. A link may include a network node position, a UE position, and an estimated pathloss value associated with the distance vector between the network node position and the UE position.

In some examples, the network node may use a machine learning component that includes one or more neural network components to predict a first plurality of predicted pathloss values associated with a second subset of positions of the dataset. A third subset of the dataset may be used as validation data that may be used to train the machine learning component. In some examples, a fourth subset of the dataset may be used to test the machine learning component. In some examples, the trained machine learning component may be deployed to facilitate determining locations for deploying new network nodes by predicting pathloss values associated with potential network node positions and/or to facilitate positioning operations (sometimes referred to as localization operations) with respect to UEs and/or network nodes.

As indicated above, FIG. 6 is provided as an example. Other examples may differ from what is described with regard to FIG. 6.

Figure 7:
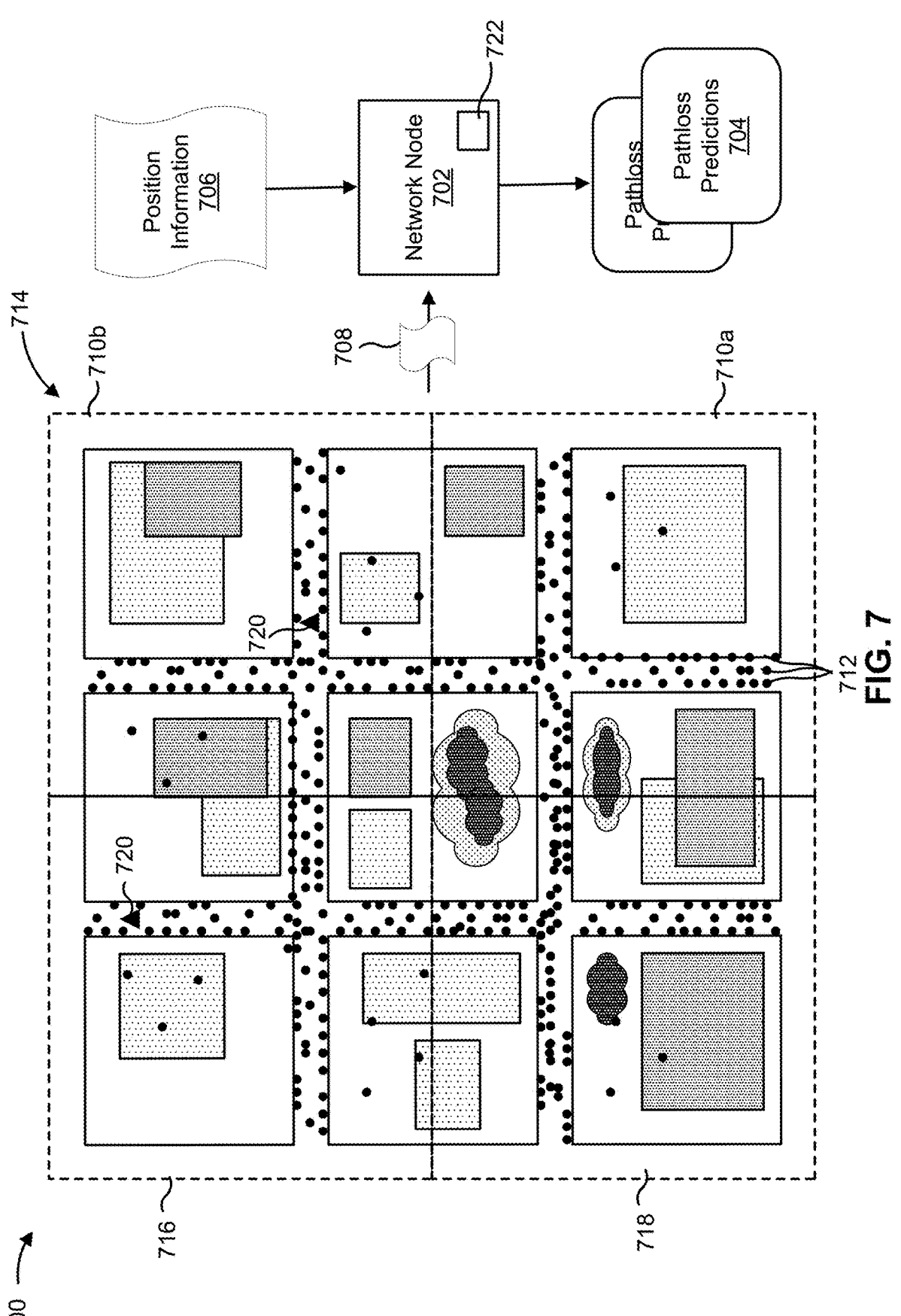
FIG. 7 is a diagram illustrating an example associated with pathloss estimation using a machine learning component, in accordance with the present disclosure.

FIG. 7 is a diagram illustrating an example 700 associated with pathloss estimation using a machine learning component, in accordance with the present disclosure. As shown, in some aspects, a network node 702 may be configured to predict pathloss values (shown as "pathloss predictions 704").

As shown, the network node 702 may obtain position information 706 and map information 708. The position information may be associated with a first subset of network node positions 712, of a set of network node positions, in connection with a map 714 associated with a wireless coverage area. The first subset of network node positions 712 may be included in a quadrant 710a of the map 714. In some aspects, the network node positions 712 may be simulated network node positions. In some other aspects, the network node positions 712 may be actual (e.g., measured or otherwise determined) network node positions. A number of network node positions are depicted. For example, the network node positions may correspond to small cells, repeaters, or the like, so a large number of network nodes may be deployed. UE positions are depicted as black triangles, and network node positions are depicted as black circles. In some examples herein, UE positions may be used for the purpose of pathloss prediction at the UE positions (or at network node positions based on the UE positions), so a relatively larger number of network node positions than UE positions is depicted.

In some aspects, the map 714 may be divided into quadrants and two quadrants 710a and 710b, as shown, may be used for training data. A third quadrant 716 may be used as validation data, to train a machine learning component, and a fourth quadrant 718 may be used as testing data. In some aspects, the position information 706 may indicate a subset of distance values of a set of distance values. Each distance value of the set of distance values may correspond to a distance between a UE position 720, of a set of UE positions 720, and a respective network node position 712 of the set of network node positions 712. In some aspects, the set of UE positions 720 may include a set of simulated UE positions. In some other aspects, the set of UE positions 720 may include a set of actual (e.g., measured or otherwise determined) UE positions. It should be noted that the map 714 can be divided in any fashion (in some examples, without using quadrants). Furthermore, network node positions and UE positions can be divided for purposes of training and testing in any fashion.

As shown, the network node 702 may obtain map information 708 associated with the map 714. The map information 708 may indicate a subset of links, of a set of links. A link of the subset of links may include a UE position 720 of a subset of UE positions 720, of the set of UE positions 720, a network node position 712 of the first subset of network node positions 712, and an estimated pathloss value, of a first subset of estimated pathloss values of a set of estimated pathloss values, between the UE position 720 and the network node position 712. The network node 702 may determine, based on a machine learning component 722, a first plurality of predicted pathloss values 704 (shown as pathloss predictions 704) associated with a second subset of network node positions 712 of the set of network node positions 712.

In some aspects, the network node 702 may train the machine learning component 722 based on the first plurality of predicted pathloss values and a second subset of estimated pathloss values of the set of estimated pathloss values (e.g., associated with the third quadrant 716 of the map 714). In some aspects, the network node 702 may output information based on the machine learning component 722. For example, the network node 702 may determine, based on the machine learning component 722, a second plurality of predicted pathloss values 704. As another example, the network node 702 may perform a communication task associated with the wireless coverage area based on the second plurality of predicted pathloss values 704. As another example, in some aspects, the network node 702 may establish, determine, or report a new network node location. As another example, the network node 702 may trigger establishment of a new network node location, such as by activating a deactivated network node. As another example, the network node 702 may perform a localization operation in association with a UE. A localization operation may include identifying (e.g., estimating) a position of a UE or a network node. For example, the network node 702 may provide information indicating a position of a UE or a network node.

The techniques described herein are primarily described with regard to links between UEs and network nodes. However, these techniques can also be applied for links between UEs (in the absence of network nodes, such as in a sidelink or device-to-device deployment) and for links between network nodes (such as in an IAB context).

As indicated above, FIG. 7 is provided as an example. Other examples may differ from what is described with regard to FIG. 7.

Figure 8:
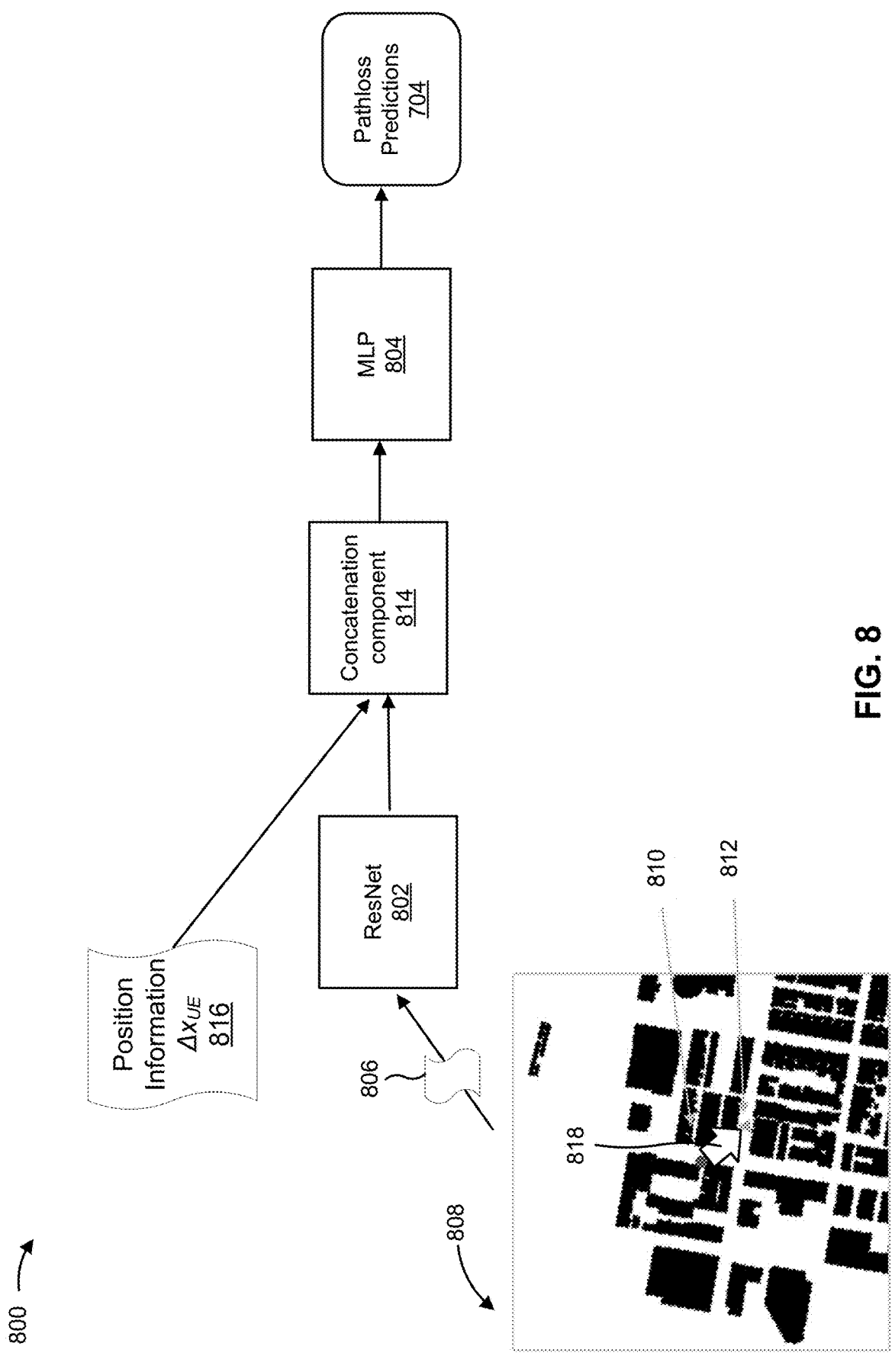
FIG. 8 is a diagram illustrating an example of a machine learning component for pathloss estimation, in accordance with the present disclosure.

FIG. 8 is a diagram illustrating an example 800 of a machine learning component for pathloss estimation, in accordance with the present disclosure.

As shown, the machine learning component of example 800 includes a residual neural network (ResNet) 802 and a multi-layer perceptron (MLP) 804. The ResNet 802 takes, as input, map information 806. The map information 806 may include a plurality of map portions 808. Each map portion 808 of the plurality of map portions may correspond to a respective distance value of the subset of distance values and may include a single respective network node position 810 of the first subset of network node positions and a single UE position 812 of the subset of UE positions. The ResNet 802 may generate a ResNet output that is concatenated, by a concatenation component 814 with position information 816 to generate a concatenated input. For example, in example 800, the position information 816 may indicate a subset of distance vectors $\Delta x_{UE}$ of a set of distance vectors. Each distance vector of the subset of distance vectors may correspond to a respective link of the subset of links. Each distance vector of the subset of distance vectors may include a direction 818 associated with a link of the subset of links and a corresponding distance value of the subset of distance values. The concatenated input may be provided to the MLP 804, which may predict a predicted pathloss value of the first plurality of predicted pathloss values.

As indicated above, FIG. 8 is provided as an example. Other examples may differ from what is described with regard to FIG. 8.

Figure 9:
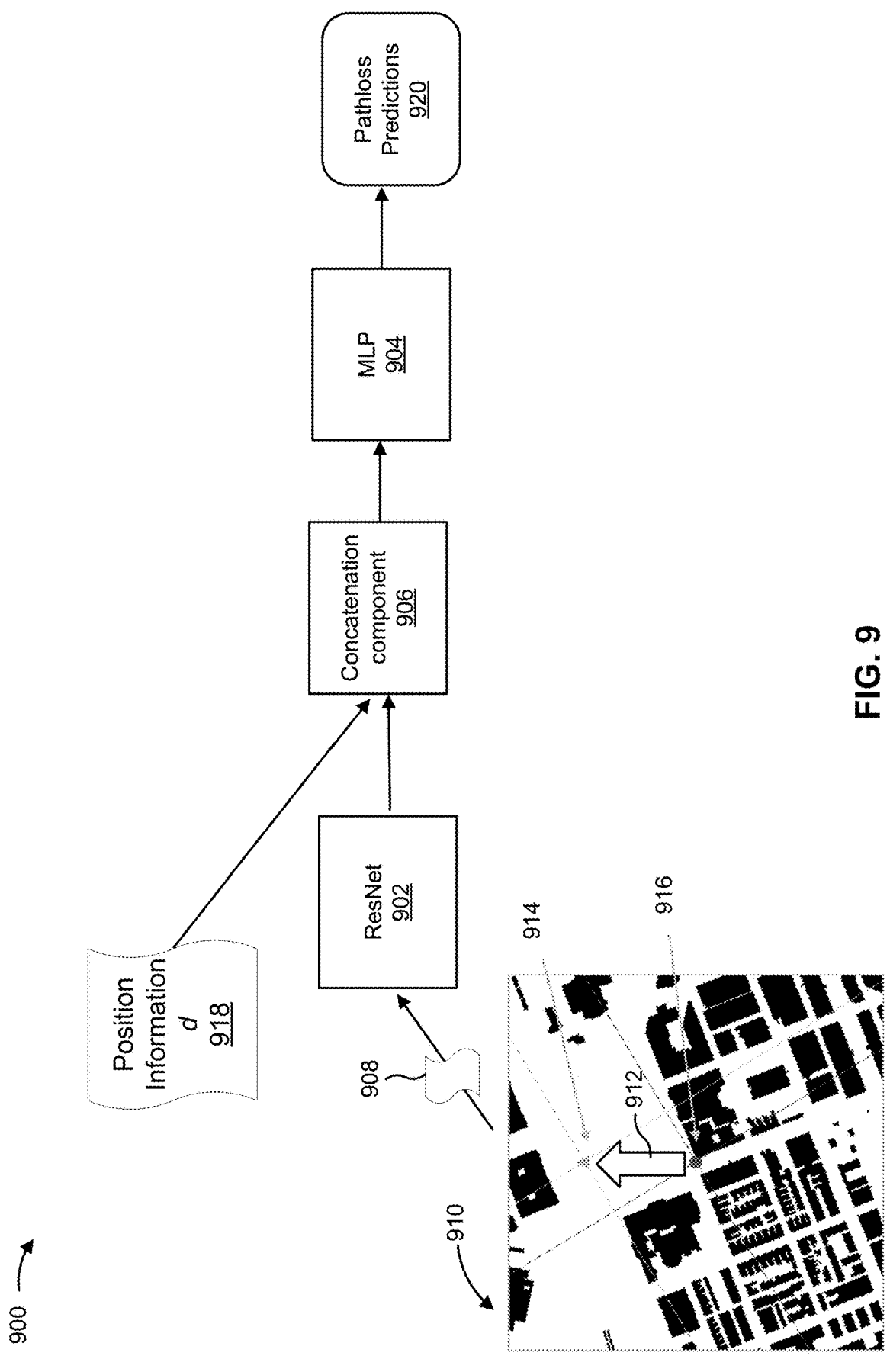
FIG. 9 is a diagram illustrating an example of a machine learning component for pathloss estimation, in accordance with the present disclosure.

FIG. 9 is a diagram illustrating an example 900 of a machine learning component for pathloss prediction, in accordance with the present disclosure.

As shown, the machine learning component of example 900 may include the same components as the machine learning component of example 800. For example, the machine learning component of example 900 may include a ResNet 902, an MLP 904, and a concatenation component 906. However, to reduce computational overhead, the map information 908 may include map portions 910 that have been oriented (e.g., rotated) so that each link of the subset of links has a same direction 912 as each other link of the subset of links. For example, each map portion 910 may be oriented such that the UE position 914 is in a same direction 912 with respect to the network node position 916. As shown, for example, the map portion 910 may be a top-oriented map portion 910 (e.g., where the UE position 914 is located at a top of the map portion 910 with respect to the network node position 916). In some other aspects, the map portion 910 may have any other orientation so long as each map portion 910 associated with the map information 908 has the same orientation.

In this way, the position information 918 may include only the subset of distance values d (and not the associated direction 912). For example, the subset of distance values d may include a subset of absolute values d. In some aspects, the network node may concatenate, using the concatenation component 906, the map portion 910 with the respective distance value of the position information 918 to generate a concatenated input, and may predict, using the MLP 904 and based on the concatenated input, a predicted pathloss value 920.

As indicated above, FIG. 9 is provided as an example. Other examples may differ from what is described with regard to FIG. 9.

Figure 10:
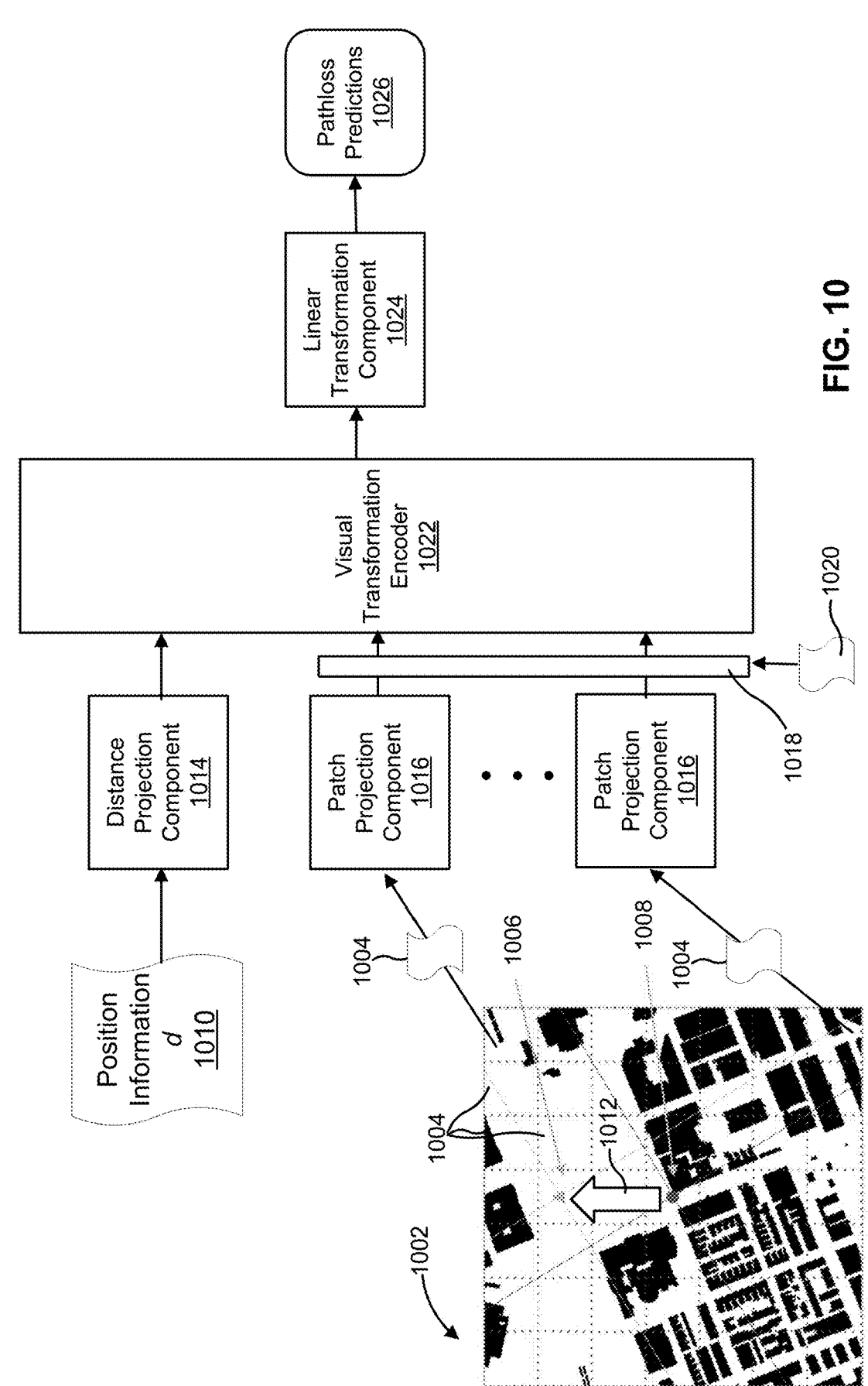
FIG. 10 is a diagram illustrating an example of a machine learning component for pathloss estimation, in accordance with the present disclosure.

FIG. 10 is a diagram illustrating an example 1000 of a machine learning component for pathloss prediction, in accordance with the present disclosure. In example 1000, each map portion 1002 may be divided into patches 1004, where a patch 1004 may include a subset of a map portion 1002. For example, the illustrated map portion 1002 is divided into 49 patches 1004. However, the network node may be configured to divide each map portion 1002 into any number of patches 1004. The determination of the number of patches 1004 into which to divide the map portion 1002 may be based on the UE position 1006 (e.g., with respect to the network node position 1008). For example, each map portion 1002 may be oriented such that the UE position 1006 is in a same direction 1012 with respect to the network node position 1008, so that only distance values may be used for the position information 1010.

As shown, the network node may generate a distance projection output. The network node may generate the distance projection output using a distance projection component 1014 that takes, as input, a distance value of the subset of distance values. For example, in some aspects, the distance projection component 1014 may include a rectified linear unit (ReLU). The network node may generate a patch projection using a patch projection component 1016 that takes, as input, a patch 1004 of the plurality of patches. In some aspects, for example, the patch projection component 1016 may provide a linear transformation of the pixels of each patch 1004 to a different dimension. In one example, each patch 1004 may be 33×33 pixels in size. In some aspects, the machine learning component of example 1000 may include a patch projection component 1016 for each patch 1004 of the map portion 1002. Each patch projection may be concatenated, using a concatenation component 1018, with a position embedding 1020, of a plurality of position embeddings associated with the plurality of patches, to generate a concatenated input. The position embeddings 1020 may correspond to the respective network node positions 1008. The network node may generate an encoded prediction using a visual transformation encoder 1022 that takes, as input, the distance projection output and the concatenated output. The network node may generate a predicted pathloss value 1026 of the first plurality of predicted pathloss values. The network node may generate the predicted pathloss value 1026 using a linear transformation component 1024 that takes, as input, the encoded prediction.

As indicated above, FIG. 10 is provided as an example. Other examples may differ from what is described with regard to FIG. 10.

FIG. 11 is a diagram illustrating an example process 1100 performed, for example, by a network node, in accordance with the present disclosure. Example process 1100 is an example where the network node (e.g., network node 702) performs operations associated with pathloss prediction using a machine learning component.

As shown in FIG. 11, in some aspects, process 1100 may include obtaining position information associated with a first subset of network node positions, of a set of network node positions, in connection with a map associated with a wireless coverage area, the position information indicating a subset of distance values of a set of distance values, wherein each distance value of the set of distance values corresponds to a distance between a UE position, of a set of UE positions, and a respective network node position of the set of network node positions (block 1110). For example, the network node (e.g., using reception component 1302 and/or communication manager 1306, depicted in FIG. 13) may obtain position information associated with a first subset of network node positions, of a set of network node positions. The network node may obtain the position information in connection with a map associated with a wireless coverage area. The position information may indicate a subset of distance values of a set of distance values. In some aspects, each distance value of the set of distance values corresponds to a distance between a UE position, of a set of UE positions, and a respective network node position of the set of network node positions, as described above.

As further shown in FIG. 11, in some aspects, process 1100 may include obtaining map information associated with the map, the map information indicating a subset of links, of a set of links, wherein each link of the subset of links includes a UE position of a subset of UE positions, of the set of UE positions, a network node position of the first subset of network node positions, and an estimated pathloss value, of a first subset of estimated pathloss values of a set of estimated pathloss values, between the UE position and the network node position (block 1120). For example, the network node (e.g., using reception component 1202 and/or communication manager 1206, depicted in FIG. 12) may obtain map information associated with the map. The map information may indicate a subset of links, of a set of links. In some aspects, each link of the subset of links includes: a UE position of a subset of UE positions, of the set of UE positions; a network node position of the first subset of network node positions; and an estimated pathloss value, of a first subset of estimated pathloss values of a set of estimated pathloss values, between the UE position and the network node position, as described above.

As further shown in FIG. 11, in some aspects, process 1100 may include determining, based on a machine learning component, a first plurality of predicted pathloss values associated with a second subset of network node positions of the set of network node positions (block 1130). For example, the network node (e.g., using communication manager 1206, depicted in FIG. 12) may determine, based on a machine learning component, a first plurality of predicted pathloss values associated with a second subset of network node positions of the set of network node positions, as described above.

As further shown in FIG. 11, in some aspects, process 1100 may include training the machine learning component based on the first plurality of predicted pathloss values and a second subset of estimated pathloss values of the set of estimated pathloss values (block 1140). For example, the network node (e.g., using communication manager 1206, depicted in FIG. 12) may train the machine learning component based on the first plurality of predicted pathloss values and a second subset of estimated pathloss values of the set of estimated pathloss values, as described above.

As further shown in FIG. 11, in some aspects, process 1100 may optionally include determining, based on the machine learning component, a second plurality of predicted pathloss values (block 1150). For example, the network node (e.g., using communication manager 1206, depicted in FIG. 12) may determine, based on the machine learning component, a second plurality of predicted pathloss values, as described above. In some aspects, this may be referred to as outputting information associated with the machine learning component. In some aspects, outputting information may include providing one or more parameters associated with the machine learning component, such as parameters of one or more machine learning models of the machine learning component. In some aspects, determining the second plurality of predicted pathloss values may be based at least in part on at least part of the position information and/or at least part of the map information.

As further shown in FIG. 11, in some aspects, process 1100 may optionally include performing a communication task associated with the wireless coverage area based on the second plurality of predicted pathloss values (block 1160). For example, the network node (e.g., using communication manager 1206, depicted in FIG. 12) may perform a communication task associated with the wireless coverage area based on the second plurality of predicted pathloss values, as described above.

Process 1100 may include additional aspects, such as any single aspect or any combination of aspects described below and/or in connection with one or more other processes described elsewhere herein.

In a first aspect, performing the communication task associated with the wireless coverage area comprises establishing a new network node location.

In a second aspect, alone or in combination with the first aspect, the computing device comprises a network node, and wherein performing the communication task comprises performing a localization operation in association with a UE.

In a third aspect, alone or in combination with one or more of the first and second aspects, the machine learning component comprises a residual neural network.

In a fourth aspect, alone or in combination with one or more of the first through third aspects, the machine learning component comprises a multi-layer perceptron.

In a fifth aspect, alone or in combination with one or more of the first through fourth aspects, the map information comprises a plurality of map portions, each map portion of the plurality of map portions corresponding to a respective distance value of the subset of distance values and including a single respective network node position of the first subset of network node positions and a single UE position of the subset of UE positions.

In a sixth aspect, alone or in combination with the fifth aspect, the position information indicates a subset of distance vectors, of a set of distance vectors, each distance vector of the subset of distance vectors corresponding to a respective link of the subset of links, and wherein each distance vector of the subset of distance vectors comprises a direction associated with a link of the subset of links and a corresponding distance value of the subset of distance values.

In a seventh aspect, alone or in combination with the sixth aspect, determining, based on the machine learning component, the first plurality of predicted pathloss values comprises providing, as input to a ResNet, a map portion of the plurality of map portions and a respective distance vector of the subset of distance vectors, generating a ResNet output using the ResNet, concatenating, using a concatenation component, the map portion with the respective distance vector to generate a concatenated input, and predicting, using a multi-layer perceptron and based on the concatenated input, a predicted pathloss value of the first plurality of predicted pathloss values.

In an eighth aspect, alone or in combination with one or more of the fifth through seventh aspects, each map portion of the plurality of map portions is oriented so that each link of the subset of links has a same direction as each other link of the subset of links. In a ninth aspect, alone or in combination with the eighth aspect, the position information comprises only the subset of distance values, the subset of distance values comprising a subset of absolute values. In a tenth aspect, alone or in combination with one or more of the eighth through ninth aspects, determining, based on the machine learning component, the first plurality of predicted pathloss values comprises providing, as input to a ResNet, a map portion of the plurality of map portions and a respective distance value of the subset of distance vectors, generating a ResNet output using the ResNet, concatenating, using a concatenation component, the map portion with the respective distance value to generate a concatenated input, and predicting, using a multi-layer perceptron and based on the concatenated input, a predicted pathloss value of the first plurality of predicted pathloss values.

In an eleventh aspect, alone or in combination with one or more of the eighth through tenth aspects, each map portion of the plurality of map portions comprises a plurality of patches. In a twelfth aspect, alone or in combination with the eleventh aspect, process 1100 includes determining, for a patch of the plurality of patches of a map portion of the plurality of map portions, a quantity of patches of the plurality of patches.

In a thirteenth aspect, alone or in combination with the twelfth aspect, determining the quantity of patches comprises determining the quantity of patches based on the single UE position. In a fourteenth aspect, alone or in combination with one or more of the eleventh through thirteenth aspects, a patch of the plurality of patches, associated with a map portion of the plurality of map portions, comprises a subset of pixels of a set of pixels associated with the map portion. In a fifteenth aspect, alone or in combination with one or more of the eleventh through fourteenth aspects, determining, based on the machine learning component, the first plurality of predicted pathloss values comprises generating, using a distance projection component that takes, as input, a distance value of the subset of distance values, a distance projection output, generating, using a patch projection component that takes, as input, a patch of the plurality of patches, a patch projection, concatenating, using a concatenation component, the patch projection with a position embedding, of a plurality of position embeddings associated with the plurality of patches, to generate a concatenated input, generating an encoded prediction using a visual transformation encoder that takes, as input, the distance projection output and the concatenated output, and generating, using a linear transformation component that takes, as input, the encoded prediction, a predicted pathloss value of the first plurality of predicted pathloss values.

In a sixteenth aspect, alone or in combination with one or more of the first through fifteenth aspects, process 1100 includes performing a validation operation associated with the machine learning component based on a third plurality of estimated pathloss values of the set of estimated pathloss values.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, at a network node or an apparatus of a network node, in accordance with the present disclosure. Example process 1200 is an example where the apparatus or the network node (e.g., network node 702) performs operations associated with pathloss prediction using a machine learning component.

As shown in FIG. 12, in some aspects, process 1200 may include obtaining position information associated with a set of network node positions, wherein the position information is associated with a map associated with a wireless coverage area, the position information indicating a set of distance values associated with a set of UE positions and the set of network node positions (block 1210). For example, the network node (e.g., using reception component 1302 and/or communication manager 1306, depicted in FIG. 13) may obtain position information associated with a set of network node positions, wherein the position information is associated with a map associated with a wireless coverage area, the position information indicating a set of distance values associated with a set of UE positions and the set of network node positions, as described above.

As further shown in FIG. 12, in some aspects, process 1200 may include obtaining map information associated with the map, the map information indicating a set of links, wherein a link of the set of links includes a UE position of the set of UE positions and a network node position of the set of network node positions (block 1220). For example, the network node (e.g., using reception component 1302 and/or communication manager 1306, depicted in FIG. 13) may obtain map information associated with the map, the map information indicating a set of links, wherein a link of the set of links includes a UE position of the set of UE positions and a network node position of the set of network node positions, as described above.

As further shown in FIG. 12, in some aspects, process 1200 may include obtaining, using a machine learning component, a plurality of predicted pathloss values, wherein the machine learning component receives, as input, at least part of the position information and at least part of the map information, and wherein the machine learning component outputs the plurality of predicted pathloss values (block 1230). For example, the network node (e.g., using reception component 1302 and/or communication manager 1306, depicted in FIG. 13) may obtain, using a machine learning component, a plurality of predicted pathloss values. The machine learning component may receive, as input, at least part of the position information and at least part of the map information. The machine learning component may output the plurality of predicted pathloss values, as described above.

As further shown in FIG. 12, in some aspects, process 1200 may include performing a communication task associated with the wireless coverage area based on the plurality of predicted pathloss values (block 1240). For example, the network node (e.g., using communication manager 1306, depicted in FIG. 13) may perform a communication task associated with the wireless coverage area based on the plurality of predicted pathloss values, as described above.

Process 1200 may include additional aspects, such as any single aspect or any combination of aspects described below and/or in connection with one or more other processes described elsewhere herein.

In a first aspect, performing the communication task associated with the wireless coverage area includes establish a new network node location.

In a second aspect, alone or in combination with the first aspect, performing the communication task comprises performing a localization operation in association with a UE.

In a third aspect, alone or in combination with one or more of the first and second aspects, the machine learning component comprises a residual neural network.

In a fourth aspect, alone or in combination with one or more of the first through third aspects, the machine learning component comprises a multi-layer perceptron.

In a fifth aspect, alone or in combination with one or more of the first through fourth aspects, the map information comprises a plurality of map portions, each map portion of the plurality of map portions corresponding to a respective distance value of the set of distance values and including a single respective network node position of the set of network node positions and a single UE position of the set of UE positions.

In a sixth aspect, alone or in combination with one or more of the first through fifth aspects, the position information indicates a set of distance vectors, each distance vector of the set of distance vectors corresponding to a respective link of the set of links, and wherein each distance vector of the set of distance vectors comprises a direction associated with a link of the set of links and a corresponding distance value of the set of distance values.

In a seventh aspect, alone or in combination with one or more of the first through sixth aspects, process 1200 includes providing, as input to a residual neural network (ResNet), a map portion of the plurality of map portions and a respective distance vector of the set of distance vectors, generating a ResNet output using the ResNet, concatenating, using a concatenation component, the map portion with the respective distance vector to generate a concatenated input, and predicting, using a multi-layer perceptron and based on the concatenated input, a predicted pathloss value of the plurality of predicted pathloss values.

In an eighth aspect, alone or in combination with one or more of the first through seventh aspects, each map portion of the plurality of map portions is oriented so that each link of the set of links has a same direction as each other link of the set of links.

In a ninth aspect, alone or in combination with one or more of the first through eighth aspects, the set of distance values comprises a set of absolute values.

In a tenth aspect, alone or in combination with one or more of the first through ninth aspects, process 1200 includes providing, as input to a residual neural network (ResNet), a map portion of the plurality of map portions and a respective distance value of the set of distance values, generating a ResNet output using the ResNet, concatenating, using a concatenation component, the map portion with the respective distance value to generate a concatenated input, and predicting, using a multi-layer perceptron and based on the concatenated input, a predicted pathloss value of the plurality of predicted pathloss values.

In an eleventh aspect, alone or in combination with one or more of the first through tenth aspects, each map portion of the plurality of map portions comprises a plurality of patches.

In a twelfth aspect, alone or in combination with one or more of the first through eleventh aspects, process 1200 further comprises determining, for a patch of the plurality of patches of a map portion of the plurality of map portions, a quantity of patches of the plurality of patches.

In a thirteenth aspect, alone or in combination with one or more of the first through twelfth aspects, determining the quantity of patches comprises determine the quantity of patches based on the single UE position.

In a fourteenth aspect, alone or in combination with one or more of the first through thirteenth aspects, a patch of the plurality of patches, associated with a map portion of the plurality of map portions, comprises a subset of pixels of a set of pixels associated with the map portion.

In a fifteenth aspect, alone or in combination with one or more of the first through fourteenth aspects, process 1200 includes generating, using a distance projection component that takes, as input, a distance value of the set of distance values, a distance projection output, generating, using a patch projection component that takes, as input, a patch of the plurality of patches, a patch projection, concatenating, using a concatenation component, the patch projection with a position embedding, of a plurality of position embeddings associated with the plurality of patches, to generate a concatenated input, generating an encoded prediction using a visual transformation encoder that takes, as input, the distance projection output and the concatenated input, and generating, using a linear transformation component that takes, as input, the encoded prediction, a predicted pathloss value of the plurality of predicted pathloss values.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
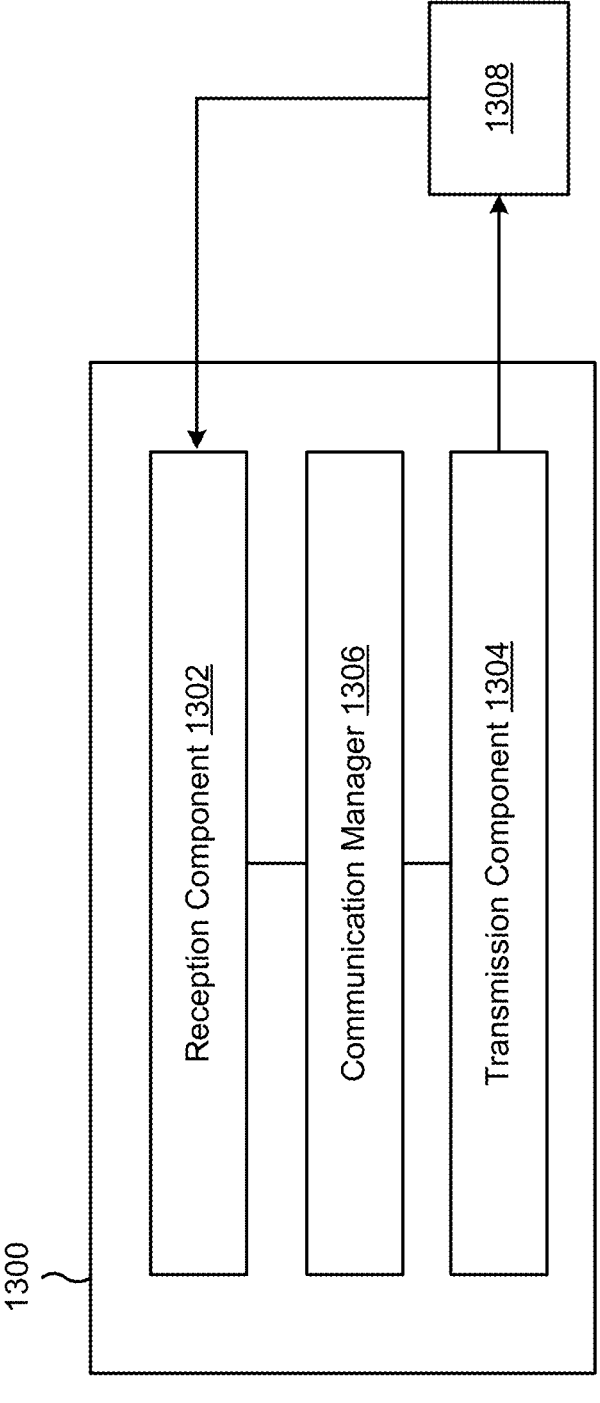
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a network node, or a network node may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 150 described in connection with FIG. 1. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIGS. 7-10. Additionally, or alternatively, the apparatus 1300 may be configured to perform one or more processes described herein, such as process 1100 of FIG. 11 or process 1200 of FIG. 12. In some aspects, the apparatus 1300 and/or one or more components shown in FIG. 13 may include one or more components of the apparatus described in connection with FIG. 2 and/or the network node described in connection with FIG. 4. Additionally, or alternatively, one or more components shown in FIG. 13 may be implemented within one or more components described in connection with the apparatus described in connection with FIG. 2 and/or the network node described in connection with FIG. 4. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network node described in connection with FIG. 2. In some aspects, the reception component 1302 and/or the transmission component 1304 may include or may be included in a network interface. The network interface may be configured to obtain and/or output signals for the apparatus 1300 via one or more communications links, such as a backhaul link, a midhaul link, and/or a fronthaul link.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, a modem, a modulator, a transmit MIMO processor, a transmit processor, a controller/processor, a memory, or a combination thereof, of the network node described in connection with FIG. 2. In some aspects, the transmission component 1304 may be co-located with the reception component 1302 in a transceiver.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

The reception component 1302 may obtain position information associated with a first subset of network node positions, of a set of network node positions, in connection with a map associated with a wireless coverage area, the position information indicating a subset of distance values of a set of distance values, wherein each distance value of the set of distance values corresponds to a distance between a UE position, of a set of UE positions, and a respective network node position of the set of network node positions.

The reception component 1302 may obtain map information associated with the map, the map information indicating a subset of links, of a set of links, wherein each link of the subset of links includes a UE position of a subset of UE positions, of the set of UE positions, a network node position of the first subset of network node positions, and an estimated pathloss value, of a first subset of estimated pathloss values of a set of estimated pathloss values, between the UE position and the network node position. The communication manager 1306 may determine, based on a machine learning component, a first plurality of predicted pathloss values associated with a second subset of network node positions of the set of network node positions. The communication manager 1306 may train the machine learning component based on the first plurality of predicted pathloss values and a second subset of estimated pathloss values of the set of estimated pathloss values. The communication manager 1306 may determine, based on the machine learning component and a third subset of estimated pathloss values of the set of estimated pathloss values, a second plurality of predicted pathloss values. The communication manager 1306 may perform a communication task associated with the wireless coverage area based on the second plurality of predicted pathloss values.

The communication manager 1306 may determine, for a patch of the plurality of patches of a map portion of the plurality of map portions, a quantity of patches of the plurality of patches. The communication manager 1306 may perform a validation operation associated with the machine learning component based on a third plurality of estimated pathloss values of the set of estimated pathloss values.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
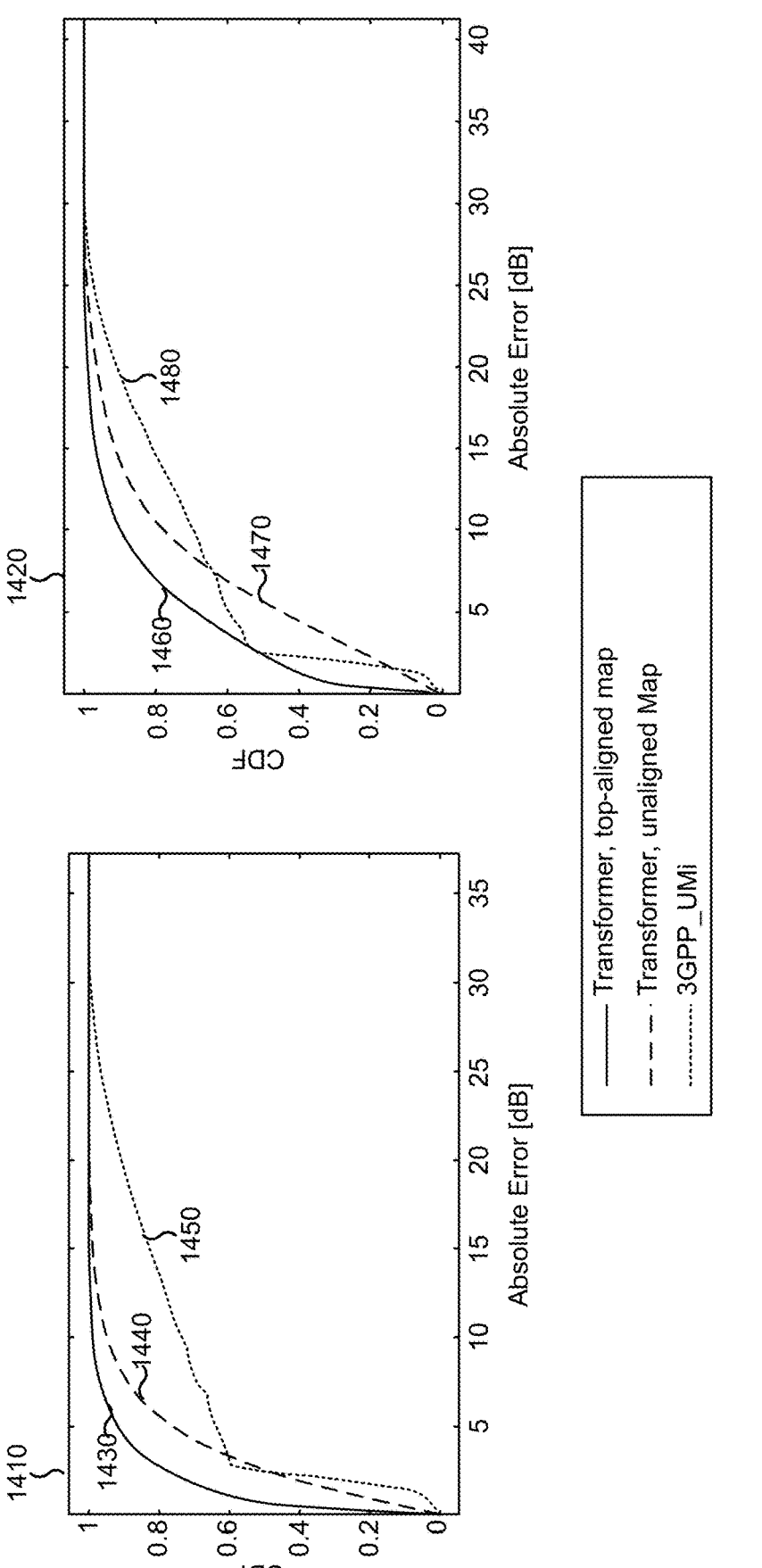
FIG. 14 is a diagram illustrating charts of pathloss prediction performance using various approaches, according to aspects described herein.

FIG. 14 is a diagram illustrating charts 1410 and 1420 of pathloss prediction performance using various approaches, according to aspects described herein. The charts 1410 and 1420 are described below after introducing Table 1, which shows results of pathloss prediction.

Table 1, below, illustrates root mean squared errors (RMSEs) and mean absolute error (MAE) of pathloss prediction using various models for two test sets: a set of known maps and a set of novel maps. The set of known maps was used for training of the various models. The set of novel maps was not used for training of the various models. Each value of Table 1 illustrates a difference (in terms of RMSE or MAE) between aggregated estimated pathloss (estimated using ray tracing) and aggregated predicted pathloss (predicted using the approach indicated in the first column of the table). The RMSE/MAE is aggregated across a number of transmitter-receiver pairs. For example, the transmitter-receiver pairs may be selected from a validation set for the map generalization. The 3GPP model incorporates a "line-of-sight oracle" which indicates whether the 3GPP model should use a line-of-sight based approach or a non-line-of-sight based approach for pathloss prediction.

As shown in Table 1, a transformer-based approach (as described with regard to machine learning component 722, visual transformation encoder 1022, and/or linear transformation component 1024) provides lower RMSE or MAE, for both known maps and novel maps, than approaches using the 3GPP channel model, UNet, or a convolutional neural network (CNN) with MLP. For example, the transformer-based approach provides RMSE of 2.27 dB on known maps and 5.31 dB on novel maps, and MAE of 1.15 dB on known maps and 3.29 dB on novel maps.

TABLE 1

| | Known maps | | Novel maps | |
|---|---|---|---|---|
| Algorithm | RMSE (dB) | MAE (dB) | RMSE (dB) | MAE (dB) |
| 3GPP w/ LOS oracle | 10.18 | 6.86 | 10.28 | 6.97 |
| UNet | 8.82 | 6.72 | 9.83 | 7.77 |
| CNN + MLP | 2.89 | 1.72 | 5.58 | 3.62 |
| Transformer | 2.27 | 1.15 | 5.31 | 3.29 |

Charts 1410 and 1420 illustrate example cumulative density functions (CDFs) of absolute error (in dB) for various models. Charts 1410 and 1420 illustrate absolute error relative to estimated pathloss (e.g., estimated using ray tracing). Chart 1410 illustrates absolute error on known maps for a transformer-based model at reference number 1430 (for top-aligned maps as described elsewhere herein) and 1440 (for non-top-aligned maps), and for the 3GPP channel model at reference number 1450. Chart 1420 illustrates absolute error on novel maps for a transformer-based model at reference number 1460 (for top-aligned maps as described elsewhere herein) and 1470 (for non-top-aligned maps), and for the 3GPP channel model at reference number 1480. It can be seen that transformer-based models, particularly using top-aligned maps, provide superior pathloss prediction/estimation across a wide range of absolute errors.

Notably, transformer-based models can adaptively process map input of various sizes, enabling processing of larger connectivity link distances without changing the resolution of the map (by increasing the map size). This property is especially useful for mmWave and shorter wavelengths in urban areas as the pathloss of relevant links is often line-of-sight dominated.

As indicated above, FIG. 14 is provided as an example. Other examples may differ from what is described with regard to FIG. 14.

The following provides an overview of some Aspects of the present disclosure:

Aspect 1: A method of wireless communication performed by a network node, comprising: obtaining position information associated with a first subset of network node positions, of a set of network node positions, in connection with a map associated with a wireless coverage area, the position information indicating a subset of distance values of a set of distance values, wherein each distance value of the set of distance values corresponds to a distance between a user equipment (UE) position, of a set of UE positions, and a respective network node position of the set of network node positions; obtaining map information associated with the map, the map information indicating a subset of links, of a set of links, wherein each link of the subset of links includes a UE position of a subset of UE positions, of the set of UE positions, a network node position of the first subset of network node positions, and an estimated pathloss value, of a first subset of estimated pathloss values of a set of estimated pathloss values, between the UE position and the network node position; determining, based on a machine learning component, a first plurality of predicted pathloss values associated with a second subset of network node positions of the set of network node positions; training the machine learning component based on the first plurality of predicted pathloss values and a second subset of estimated pathloss values of the set of estimated pathloss values; determining, based on the machine learning component and a third subset of estimated pathloss values of the set of estimated pathloss values, a second plurality of predicted pathloss values; and performing a communication task associated with the wireless coverage area based on the second plurality of predicted pathloss values.

Aspect 2: The method of Aspect 1, wherein performing the communication task associated with the wireless coverage area comprises establishing a new network node location.

Aspect 3: The method of either of claims 1 or 2, wherein the computing device comprises a network node, and wherein performing the communication task comprises performing a localization operation in association with a UE.

Aspect 4: The method of any of Aspects 1-3, wherein the machine learning component comprises a residual neural network.

Aspect 5: The method of any of Aspects 1-4, wherein the machine learning component comprises a multi-layer perceptron.

Aspect 6: The method of any of Aspects 1-5, wherein the map information comprises a plurality of map portions, each map portion of the plurality of map portions corresponding to a respective distance value of the subset of distance values and including a single respective network node position of the first subset of network node positions and a single UE position of the subset of UE positions.

Aspect 7: The method of Aspect 6, wherein the position information indicates a subset of distance vectors, of a set of distance vectors, each distance vector of the subset of distance vectors corresponding to a respective link of the subset of links, and wherein each distance vector of the subset of distance vectors comprises a direction associated with a link of the subset of links and a corresponding distance value of the subset of distance values.

Aspect 8: The method of Aspect 7, wherein determining, based on the machine learning component, the first plurality of predicted pathloss values comprises: providing, as input to a residual neural network (ResNet), a map portion of the plurality of map portions and a respective distance vector of the subset of distance vectors; generating a ResNet output using the ResNet; concatenating, using a concatenation component, the map portion with the respective distance vector to generate a concatenated input; and predicting, using a multi-layer perceptron and based on the concatenated input, a predicted pathloss value of the first plurality of predicted pathloss values.

Aspect 9: The method of any of Aspects 6-8, wherein each map portion of the plurality of map portions is oriented so that each link of the subset of links has a same direction as each other link of the subset of links.

Aspect 10: The method of Aspect 9, wherein the position information comprises only the subset of distance values, the subset of distance values comprising a subset of absolute values.

Aspect 11: The method of either of claims 9 or 10, wherein determining, based on the machine learning component, the first plurality of predicted pathloss values comprises: providing, as input to a residual neural network (ResNet), a map portion of the plurality of map portions and a respective distance value of the subset of distance values;

generating a ResNet output using the ResNet; concatenating, using a concatenation component, the map portion with the respective distance value to generate a concatenated input; and predicting, using a multi-layer perceptron and based on the concatenated input, a predicted pathloss value of the first plurality of predicted pathloss values.

Aspect 12: The method of any of Aspects 9-11, wherein each map portion of the plurality of map portions comprises a plurality of patches.

Aspect 13: The method of Aspect 12, further comprising determining, for a patch of the plurality of patches of a map portion of the plurality of map portions, a quantity of patches of the plurality of patches.

Aspect 14: The method of Aspect 13, wherein determining the quantity of patches comprises determining the quantity of patches based on the single UE position.

Aspect 15: The method of any of Aspects 12-14, wherein a patch of the plurality of patches, associated with a map portion of the plurality of map portions, comprises a subset of pixels of a set of pixels associated with the map portion.

Aspect 16: The method of any of Aspects 12-15, wherein determining, based on the machine learning component, the first plurality of predicted pathloss values comprises: generating, using a distance projection component that takes, as input, a distance value of the subset of distance values, a distance projection output; generating, using a patch projection component that takes, as input, a patch of the plurality of patches, a patch projection; concatenating, using a concatenation component, the patch projection with a position embedding, of a plurality of position embeddings associated with the plurality of patches, to generate a concatenated input; generating an encoded prediction using a visual transformation encoder that takes, as input, the distance projection output and the concatenated output; and generating, using a linear transformation component that takes, as input, the encoded prediction, a predicted pathloss value of the first plurality of predicted pathloss values.

Aspect 17: The method of any of Aspects 1-16, further comprising performing a validation operation associated with the machine learning component based on a third plurality of estimated pathloss values of the set of estimated pathloss values.

Aspect 18: A method of wireless communication performed by a network node, comprising: obtaining position information associated with a set of network node positions, wherein the position information is associated with a map associated with a wireless coverage area, the position information indicating a set of distance values associated with a set of UE positions and the set of network node positions; obtaining map information associated with the map, the map information indicating a set of links, wherein a link of the set of links includes a UE position of the set of UE positions and a network node position of the set of network node positions; obtaining, using a machine learning component, a plurality of predicted pathloss values, wherein the machine learning component receives, as input, at least part of the position information and at least part of the map information, and wherein the machine learning component outputs the plurality of predicted pathloss values; and performing a communication task associated with the wireless coverage area based on the plurality of predicted pathloss values.

Aspect 18: The method of Aspect 17, wherein performing the communication task associated with the wireless coverage area comprises establishing a new network node location.

Aspect 19: The method of any of Aspects 17-18, wherein performing the communication task comprises performing a localization operation in association with a UE.

Aspect 20: The method of any of Aspects 17-19, wherein the machine learning component comprises a residual neural network.

Aspect 21: The method of any of Aspects 17-20, wherein the machine learning component comprises a multi-layer perceptron.

Aspect 22: The method of any of Aspects 17-21, wherein the map information comprises a plurality of map portions, each map portion of the plurality of map portions corresponding to a respective distance value of the set of distance values and including a single respective network node position of the set of network node positions and a single UE position of the set of UE positions.

Aspect 23: The method of Aspect 22, wherein the position information indicates a set of distance vectors, each distance vector of the set of distance vectors corresponding to a respective link of the set of links, and wherein each distance vector of the set of distance vectors comprises a direction associated with a link of the set of links and a corresponding distance value of the set of distance values.

Aspect 24: The method of Aspect 22, wherein obtaining the plurality of predicted pathloss values comprises: providing, as input to a residual neural network (ResNet), a map portion of the plurality of map portions and a respective distance vector of the set of distance vectors; generating a ResNet output using the ResNet; concatenating, using a concatenation component, the ResNet output with the respective distance vector to generate a concatenated input; and predicting, using a multi-layer perceptron and based on the concatenated input, a predicted pathloss value of the plurality of predicted pathloss values.

Aspect 25: The method of Aspect 22, wherein each map portion of the plurality of map portions is oriented so that each link of the set of links has a same direction as each other link of the set of links.

Aspect 26: The method of Aspect 25, wherein the set of distance values comprises a set of absolute values.

Aspect 27: The method of Aspect 25, wherein obtaining the plurality of predicted pathloss values comprises: providing, as input to a residual neural network (ResNet), a map portion of the plurality of map portions and a respective distance value of the set of distance values; generating a ResNet output using the ResNet; concatenating, using a concatenation component, the ResNet output with the respective distance value to generate a concatenated input; and predicting, using a multi-layer perceptron and based on the concatenated input, a predicted pathloss value of the plurality of predicted pathloss values.

Aspect 28: The method of Aspect 25, wherein each map portion of the plurality of map portions comprises a plurality of patches.

Aspect 29: The method of Aspect 28, comprising determining, for a patch of the plurality of patches of a map portion of the plurality of map portions, a quantity of patches of the plurality of patches.

Aspect 30: The method of Aspect 29, wherein determining the quantity of patches comprises determining the quantity of patches based on the single UE position.

Aspect 31: The method of Aspect 28, wherein a patch of the plurality of patches, associated with a map portion of the plurality of map portions, comprises a subset of pixels of a set of pixels associated with the map portion.

Aspect 32: The method of Aspect 28, wherein obtaining the plurality of predicted pathloss values comprises: generating, using a distance projection component that takes, as input, a distance value of the set of distance values, a distance projection output; generating, using a patch projection component that takes, as input, a patch of the plurality of patches, a patch projection; concatenating, using a concatenation component, the patch projection with a position embedding, of a plurality of position embeddings associated with the plurality of patches, to generate a concatenated input; generating an encoded prediction using a visual transformation encoder that takes, as input, the distance projection output and the concatenated input; and generating, using a linear transformation component that takes, as input, the encoded prediction, a predicted pathloss value of the plurality of predicted pathloss values.

Aspect 33: A method of wireless communication performed by a network node, comprising: obtaining position information associated with a first subset of network node positions, of a set of network node positions, in connection with a map associated with a wireless coverage area, the position information indicating a subset of distance values of a set of distance values, wherein each distance value of the set of distance values corresponds to a distance between a user equipment (UE) position, of a set of UE positions, and a respective network node position of the set of network node positions; obtaining map information associated with the map, the map information indicating a subset of links, of a set of links, wherein each link of the subset of links includes a UE position of a subset of UE positions, of the set of UE positions, a network node position of the first subset of network node positions, and an estimated pathloss value, of a first subset of estimated pathloss values of a set of estimated pathloss values, between the UE position and the network node position; determining, based on a machine learning component, a first plurality of predicted pathloss values associated with a second subset of network node positions of the set of network node positions; training the machine learning component based on the first plurality of predicted pathloss values and a second subset of estimated pathloss values of the set of estimated pathloss values; and outputting information associated with the machine learning component.

Aspect 34: The method of Aspect 33, comprising: determining, based on the machine learning component, at least part of the position information, and at least part of the map information, a second plurality of predicted pathloss values; and performing a communication task associated with the wireless coverage area based on the second plurality of predicted pathloss values.

Aspect 35: The method of any of Aspects 33-34, wherein the machine learning component comprises a residual neural network.

Aspect 36: The method of any of Aspects 33-35, wherein the machine learning component comprises a multi-layer perceptron.

Aspect 37: The method of any of Aspects 33-36, wherein the map information comprises a plurality of map portions, each map portion of the plurality of map portions corresponding to a respective distance value of the subset of distance values and including a single respective network node position of the first subset of network node positions and a single UE position of the subset of UE positions.

Aspect 38: The method of Aspect 37, wherein the position information indicates a subset of distance vectors, of a set of distance vectors, each distance vector of the subset of distance vectors corresponding to a respective link of the subset of links, and wherein each distance vector of the subset of distance vectors comprises a direction associated with a link of the subset of links and a corresponding distance value of the subset of distance values.

Aspect 39: The method of Aspect 38, wherein determining, based on the machine learning component, the first plurality of predicted pathloss values comprises: providing, as input to a residual neural network (ResNet), a map portion of the plurality of map portions and a respective distance vector of the subset of distance vectors; generating a ResNet output using the ResNet; concatenating, using a concatenation component, the map portion with the respective distance vector to generate a concatenated input; and predicting, using a multi-layer perceptron and based on the concatenated input, a predicted pathloss value of the first plurality of predicted pathloss values.

Aspect 40: The method of Aspect 37, wherein each map portion of the plurality of map portions is oriented so that each link of the subset of links has a same direction as each other link of the subset of links.

Aspect 41: The method of Aspect 40, wherein the position information comprises only the subset of distance values, the subset of distance values comprising a subset of absolute values.

Aspect 42: The method of Aspect 41, wherein determining, based on the machine learning component, the first plurality of predicted pathloss values comprises: providing, as input to a residual neural network (ResNet), a map portion of the plurality of map portions and a respective distance value of the subset of distance values; generating a ResNet output using the ResNet; concatenating, using a concatenation component, the map portion with the respective distance value to generate a concatenated input; and predicting, using a multi-layer perceptron and based on the concatenated input, a predicted pathloss value of the first plurality of predicted pathloss values.

Aspect 43: The method of Aspect 41, wherein each map portion of the plurality of map portions comprises a plurality of patches.

Aspect 44: The method of Aspect 43, comprising determining, for a patch of the plurality of patches of a map portion of the plurality of map portions, a quantity of patches of the plurality of patches.

Aspect 45: The method of Aspect 44, comprising determining the quantity of patches, are configured to cause the network node to determine the quantity of patches based on the single UE position.

Aspect 46: The method of Aspect 43, wherein a patch of the plurality of patches, associated with a map portion of the plurality of map portions, comprises a subset of pixels of a set of pixels associated with the map portion.

Aspect 47: The method of Aspect 43, wherein determining, based on the machine learning component, the first plurality of predicted pathloss values comprises: generating, using a distance projection component that takes, as input, a distance value of the subset of distance values, a distance projection output; generating, using a patch projection component that takes, as input, a patch of the plurality of patches, a patch projection; concatenating, using a concatenation component, the patch projection with a position embedding, of a plurality of position embeddings associated with the plurality of patches, to generate a concatenated input; generating an encoded prediction using a visual transformation encoder that takes, as input, the distance projection output and the concatenated input; and generating, using a linear transformation component that takes, as input, the encoded prediction, a predicted pathloss value of the first plurality of predicted pathloss values.

Aspect 48: The method of any of Aspects 33-47, comprising performing a validation operation associated with the machine learning component based on a third plurality of estimated pathloss values of the set of estimated pathloss values.

Aspect 49: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-48.

Aspect 50: An apparatus for wireless communication at a device, the apparatus comprising one or more memories and one or more processors coupled to the one or more memories, the one or more processors configured to cause the device to perform the method of one or more of Aspects 1-48.

Aspect 51: An apparatus for wireless communication, the apparatus comprising at least one means for performing the method of one or more of Aspects 1-48.

Aspect 52: A non-transitory computer-readable medium storing code for wireless communication, the code comprising instructions executable by one or more processors to perform the method of one or more of Aspects 1-48.

Aspect 53: A non-transitory computer-readable medium storing a set of instructions for wireless communication, the set of instructions comprising one or more instructions that, when executed by one or more processors of a device, cause the device to perform the method of one or more of Aspects 1-48.

Aspect 54: A device for wireless communication, the device comprising a processing system that includes one or more processors and one or more memories coupled with the one or more processors, the processing system configured to cause the device to perform the method of one or more of Aspects 1-48.

Aspect 55: An apparatus for wireless communication at a device, the apparatus comprising one or more memories and one or more processors coupled to the one or more memories, the one or more processors individually or collectively configured to cause the device to perform the method of one or more of Aspects 1-48.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A network node for wireless communication, comprising:

one or more memories; and one or more processors, coupled to the one or more memories, configured to cause the network node to:

obtain position information associated with a set of network node positions, wherein the position information is associated with a map associated with a wireless coverage area, the position information indicating a set of distance values associated with a set of user equipment (UE) positions and the set of network node positions;

obtain map information associated with the map, the map information indicating a set of links, wherein a link of the set of links includes a UE position of the set of UE positions and a network node position of the set of network node positions;

obtain, using a machine learning component, a plurality of predicted pathloss values, wherein the machine learning component receives, as input, at least part of the position information and at least part of the map information, and wherein the machine learning component outputs the plurality of predicted pathloss values; and perform a communication task associated with the wireless coverage area based on the plurality of predicted pathloss values.

2. The network node of claim 1, wherein the one or more processors, to cause the network node to perform the communication task associated with the wireless coverage area, are configured to cause the network node to establish a new network node location.

3. The network node of claim 1, wherein the one or more processors, to cause the network node to perform the communication task, are configured to cause the network node to perform a localization operation in association with a UE.

4. The network node of claim 1, wherein the map information comprises a plurality of map portions, each map portion of the plurality of map portions corresponding to a respective distance value of the set of distance values and including a single respective network node position of the set of network node positions and a single UE position of the set of UE positions.

5. The network node of claim 4, wherein the position information indicates a set of distance vectors, each distance vector of the set of distance vectors corresponding to a respective link of the set of links, and wherein each distance vector of the set of distance vectors comprises a direction associated with a link of the set of links and a corresponding distance value of the set of distance values.

6. The network node of claim 5, wherein the one or more processors, to cause the network node to obtain the plurality of predicted pathloss values, are configured to cause the network node to:

provide, as input to a residual neural network (ResNet), a map portion of the plurality of map portions and a respective distance vector of the set of distance vectors;

generate a ResNet output using the ResNet;

concatenate, using a concatenation component, the ResNet output with the respective distance vector to generate a concatenated input; and predict, using a multi-layer perceptron and based on the concatenated input, a predicted pathloss value of the plurality of predicted pathloss values.

7. The network node of claim 4, wherein each map portion of the plurality of map portions is oriented so that each link of the set of links has a same direction as each other link of the set of links.

8. The network node of claim 7, wherein the set of distance values comprises a set of absolute values.

9. The network node of claim 7, wherein the one or more processors, to cause the network node to obtain the plurality of predicted pathloss values, are configured to cause the network node to:

provide, as input to a residual neural network (ResNet), a map portion of the plurality of map portions and a respective distance value of the set of distance values;

generate a ResNet output using the ResNet;

concatenate, using a concatenation component, the ResNet output with the respective distance value to generate a concatenated input; and predict, using a multi-layer perceptron and based on the concatenated input, a predicted pathloss value of the plurality of predicted pathloss values.

10. The network node of claim 7, wherein each map portion of the plurality of map portions comprises a plurality of patches.

11. The network node of claim 10, wherein the one or more processors are further configured to cause the network node to determine, for a patch of the plurality of patches of a map portion of the plurality of map portions, a quantity of patches of the plurality of patches.

12. The network node of claim 11, wherein the one or more processors, to cause the network node to determine the quantity of patches, are configured to cause the network node to determine the quantity of patches based on the single UE position.

13. The network node of claim 10, wherein a patch of the plurality of patches, associated with a map portion of the plurality of map portions, comprises a subset of pixels of a set of pixels associated with the map portion.

14. The network node of claim 10, wherein the one or more processors, to cause the network node to obtain the plurality of predicted pathloss values, are configured to cause the network node to:

generate, using a distance projection component that takes, as input, a distance value of the set of distance values, a distance projection output;

generate, using a patch projection component that takes, as input, a patch of the plurality of patches, a patch projection;

concatenate, using a concatenation component, the patch projection with a position embedding, of a plurality of position embeddings associated with the plurality of patches, to generate a concatenated input;

generate an encoded prediction using a visual transformation encoder that takes, as input, the distance projection output and the concatenated input; and generate, using a linear transformation component that takes, as input, the encoded prediction, a predicted pathloss value of the plurality of predicted pathloss values.

15. A method of wireless communication performed by a network node, comprising:

obtaining position information associated with a set of network node positions, wherein the position information is associated with a map associated with a wireless coverage area, the position information indicating a set of distance values associated with a set of user equipment (UE) positions and the set of network node positions;

obtaining map information associated with the map, the map information indicating a set of links, wherein a link of the set of links includes a UE position of the set of UE positions and a network node position of the set of network node positions;

obtaining, using a machine learning component, a plurality of predicted pathloss values, wherein the machine learning component receives, as input, at least part of the position information and at least part of the map information, and wherein the machine learning component outputs the plurality of predicted pathloss values; and performing a communication task associated with the wireless coverage area based on the plurality of predicted pathloss values.

16. The method of claim 15, wherein performing the communication task comprises performing a localization operation in association with a UE.

17. The method of claim 15, wherein the map information comprises a plurality of map portions, each map portion of the plurality of map portions corresponding to a respective distance value of the set of distance values and including a single respective network node position of the set of network node positions and a single UE position of the set of UE positions.

18. The method of claim 17, wherein each map portion of the plurality of map portions is oriented so that each link of the set of links has a same direction as each other link of the set of links.

19. The method of claim 18, wherein each map portion of the plurality of map portions comprises a plurality of patches, wherein the method comprises determining, for a patch of the plurality of patches of a map portion of the plurality of map portions, a quantity of patches of the plurality of patches.

20. The method of claim 19, wherein a patch of the plurality of patches, associated with a map portion of the plurality of map portions, comprises a subset of pixels of a set of pixels associated with the map portion.

* * * * *